(12) United States Patent
Lee

(10) Patent No.: US 11,366,929 B2
(45) Date of Patent: Jun. 21, 2022

(54) ELECTRONIC DEVICE AND METHOD FOR PROTECTING PERSONAL INFORMATION USING SECURE SWITCH

(71) Applicant: Samsung Electronics Co., Ltd., Gyeonggi-do (KR)

(72) Inventor: Sunghyuk Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 151 days.

(21) Appl. No.: 16/931,616

(22) Filed: Jul. 17, 2020

(65) Prior Publication Data

US 2021/0026983 A1 Jan. 28, 2021

(30) Foreign Application Priority Data

Jul. 24, 2019 (KR) ........................ 10-2019-0089432

(51) Int. Cl.
*G06F 21/62* (2013.01)
*G06F 21/32* (2013.01)
(Continued)

(52) U.S. Cl.
CPC .......... *G06F 21/6245* (2013.01); *G06F 21/32* (2013.01); *G06F 21/74* (2013.01);
(Continued)

(58) Field of Classification Search
CPC ...... G06F 21/6245; G06F 21/32; G06F 21/74; G06F 21/79; H04L 9/3247; H04L 2209/38; H04L 9/50
See application file for complete search history.

(56) References Cited

U.S. PATENT DOCUMENTS 8,108,318 B2 * 1/2012 Mardikar ........... G06Q 20/1085
705/72
10,044,510 B2 8/2018 Kwon et al.
(Continued)

FOREIGN PATENT DOCUMENTS

CN 109886662 A 6/2019
EP 3246845 A1 * 11/2017 ......... G06F 12/1408
(Continued)

OTHER PUBLICATIONS

Tim Cooijmans, Joeri de Ruiter, Erik Poll; "Analysis of Secure Key Storage Solutions on Android"; pp. 11-20.
(Continued)

*Primary Examiner* — Darshan I Dhruv
(74) *Attorney, Agent, or Firm* — Cha & Reiter, LLC

(57) ABSTRACT

An electronic device according to an embodiment includes: a memory configured to store encryption information, a processor, and a switch configured to electrically disconnect the processor from the memory in a first state and to electrically connect the processor and the memory in a second state. The processor is configured to receive a user input for switching the switch from the first state to the second state, provide the encryption information stored in the memory to a secure application executing only in a second execution environment through a secure operating system of the second execution environment, when the switch is switched from the first state to the second state to generate an electrical path between the memory and the processor, acquire signature information for a transaction based on the encryption information, and provide the signature information acquired based on the encryption information to a signature request application.

16 Claims, 12 Drawing Sheets

(51) Int. Cl.
  *G06F 21/79* (2013.01)
  *G06F 21/74* (2013.01)
  *G06F 11/30* (2006.01)
  *G06F 12/14* (2006.01)
  *H04L 9/32* (2006.01)
  *H04L 9/00* (2022.01)

(52) U.S. Cl.
  CPC ............ *G06F 21/79* (2013.01); *H04L 9/3247* (2013.01); *H04L 9/50* (2022.05)

(56) References Cited

U.S. PATENT DOCUMENTS

| | | | |
|---|---|---|---|
| 10,754,967 B1* | 8/2020 | Arora | G06F 21/74 |
| 11,120,438 B1* | 9/2021 | Belshe | H04L 9/3239 |
| 2013/0283380 A1* | 10/2013 | Thadikaran | G06F 21/85 |
| | | | 726/23 |
| 2013/0307670 A1* | 11/2013 | Ramaci | G07C 9/257 |
| | | | 340/5.82 |
| 2015/0082422 A1 | 3/2015 | Yoffe et al. | |
| 2015/0121516 A1* | 4/2015 | Korkishko | G06F 21/31 |
| | | | 726/19 |
| 2016/0253519 A1* | 9/2016 | Broumas | H04L 9/0866 |
| | | | 713/189 |
| 2016/0371683 A1 | 12/2016 | Maus et al. | |
| 2017/0061436 A1* | 3/2017 | Liu | G06F 21/575 |
| 2017/0288874 A1 | 10/2017 | Trivedi et al. | |
| 2018/0218358 A1* | 8/2018 | Mardikar | G06Q 20/40 |
| 2018/0254898 A1 | 9/2018 | Sprague et al. | |
| 2018/0268390 A1 | 9/2018 | Nuzum et al. | |
| 2019/0042758 A1 | 2/2019 | Francois et al. | |
| 2019/0121988 A1* | 4/2019 | van de Ruit | G06Q 20/36 |
| 2019/0138707 A1* | 5/2019 | Hiltgen | H04L 63/0492 |
| 2019/0325154 A1* | 10/2019 | Divakaran | G06F 21/629 |

FOREIGN PATENT DOCUMENTS

| | | | | |
|---|---|---|---|---|
| KR | 10-2015-0072061 A | 6/2015 | | |
| KR | 10-2016-0101635 A | 8/2016 | | |
| KR | 10-2016-0124336 A | 10/2016 | | |
| KR | 10-1740391 B1 | 6/2017 | | |
| WO | WO-2016128906 A1 * | 8/2016 | | G06F 21/32 |

OTHER PUBLICATIONS

International Search Report dated Oct. 30, 2020.
European Search Report dated Dec. 2, 2020.

* cited by examiner

ELECTRONIC DEVICE AND METHOD FOR PROTECTING PERSONAL INFORMATION USING SECURE SWITCH

CROSS-REFERENCE TO RELATED APPLICATION(S)

This application is based on and claims priority under 35 U.S.C. 119 to Korean Patent Application No. 10-2019-0089432, filed on Jul. 24, 2019, in the Korean Intellectual Property Office, the disclosure of which is herein incorporated by reference in its entirety.

BACKGROUND

1) Field

One or more embodiments of the instant disclosure generally relate to an electronic device and method for protecting personal information using a secure switch.

2) Description of Related Art

A conventional electronic device may include a secure memory for storing the user's personal information. The secure memory may be physically separated from the general memory, and the user may store secure data in the secure memory area in order to enhance the security of the data.

The above information is presented as background information only to assist with an understanding of the disclosure. No determination has been made, and no assertion is made, as to whether any of the above might be applicable as prior art with regard to the disclosure.

SUMMARY

The electronic device described above may designate one or more applications for which access to the secure memory is permitted in order to prevent access to the personal information stored in the secure memory by unauthorized or malicious applications. However, since the processor of the electronic device and the secure memory are electrically connected, the personal information stored in the secure memory may be stolen by the malicious applications when the malicious applications attack the operating system using various vulnerabilities of the operating system.

Accordingly, a method of minimizing the time during which the processor of the electronic device is electrically connected to the secure memory may be required to minimize the likelihood that personal information stored in the secure memory can be stolen by malicious applications.

The technical problems to be achieved in this document are not limited to the technical problems mentioned above, and other technical problems not mentioned can be clearly understood by those skilled in the art from the following description.

An electronic device according to an embodiment may include: a display; a memory configured to store encryption information; a processor; and a switch configured to electrically disconnect the processor from the memory in a first state and to electrically connect the processor and the memory in a second state, wherein the processor is configured to receive a user input for switching the switch from the first state to the second state while the switch is in the first state, to provide the encryption information stored in the memory to a secure application executing only in a second execution environment through a secure operating system of the second execution environment, when the switch is switched from the first state to the second state to generate an electrical path between the memory and the processor, to acquire signature information for a transaction based on the encryption information, and to provide the signature information acquired based on the encryption information to a signature request application.

An operating method of an electronic device according to an embodiment may include: receiving a user input for switching a switch of the electronic device to a second state distinct from a first state while the switch of the electronic device is in the first state, wherein a processor of the electronic device is electrically disconnected from a memory of the electronic device while the switch is in the first state; providing encryption information stored in the memory to a secure application executing only in a second execution environment of the processor through a secure operating system of the second execution environment, when the switch is switched from the first state to the second state to generate an electrical path between the memory and the processor; acquiring signature information for a transaction based on the encryption information; and providing the signature information acquired based on the encryption information to a signature request application.

The effects obtainable in the disclosure are not limited to the above-mentioned effects, and other effects not mentioned may be clearly understood by those skilled in the art from the description below.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

An electronic device and a method thereof according to one or more embodiments disclosed herein may minimize the time during which the processor and the secure memory of the electronic device are electrically connected with each other, thereby minimizing the likelihood that personal information stored in the secure memory can be stolen by malicious applications.

Figure 1:
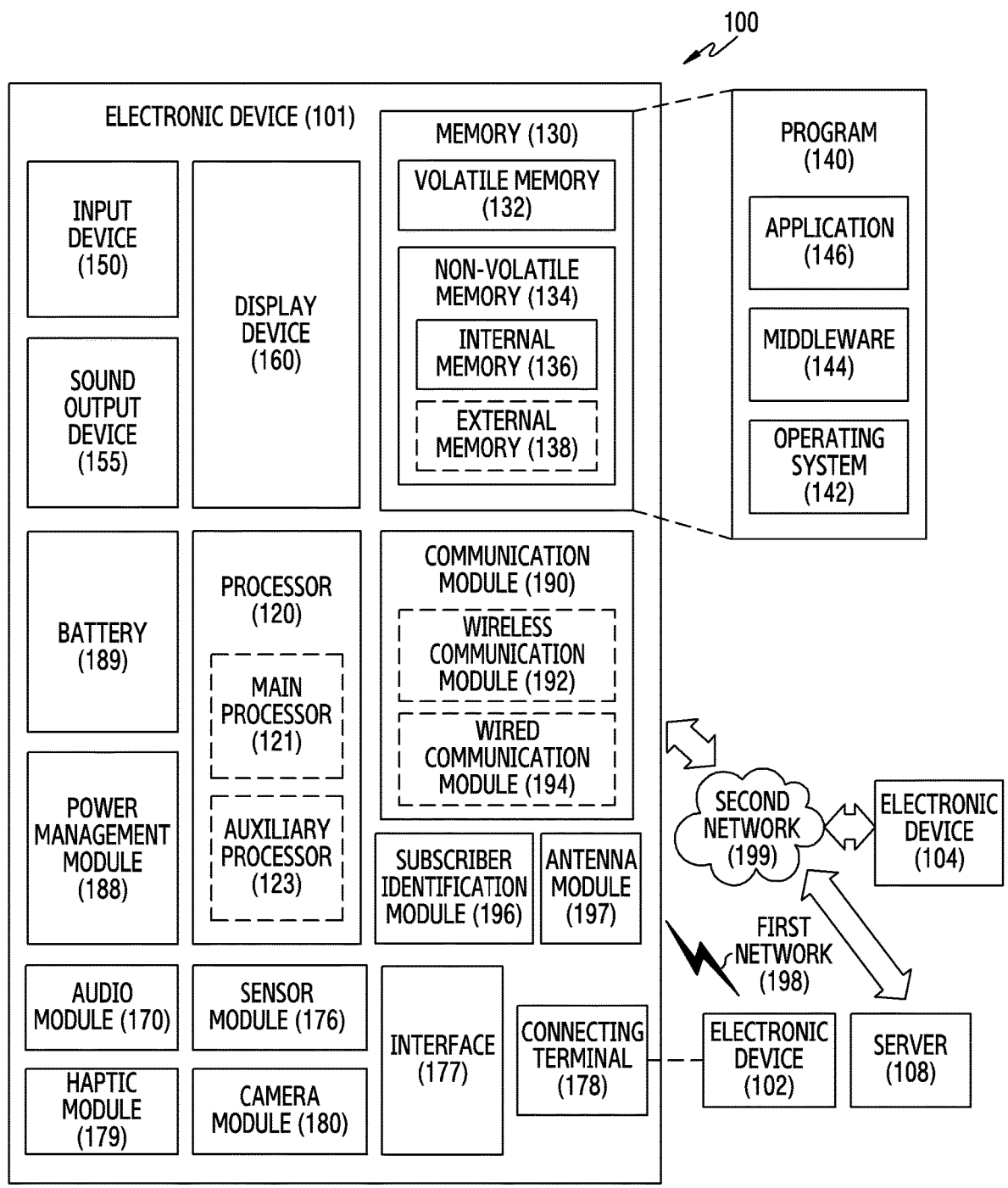
FIG. 1 is a block diagram illustrating an electronic device in a network environment according an embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to an embodiment may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that an embodiment of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. According to an embodiment, one or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2:
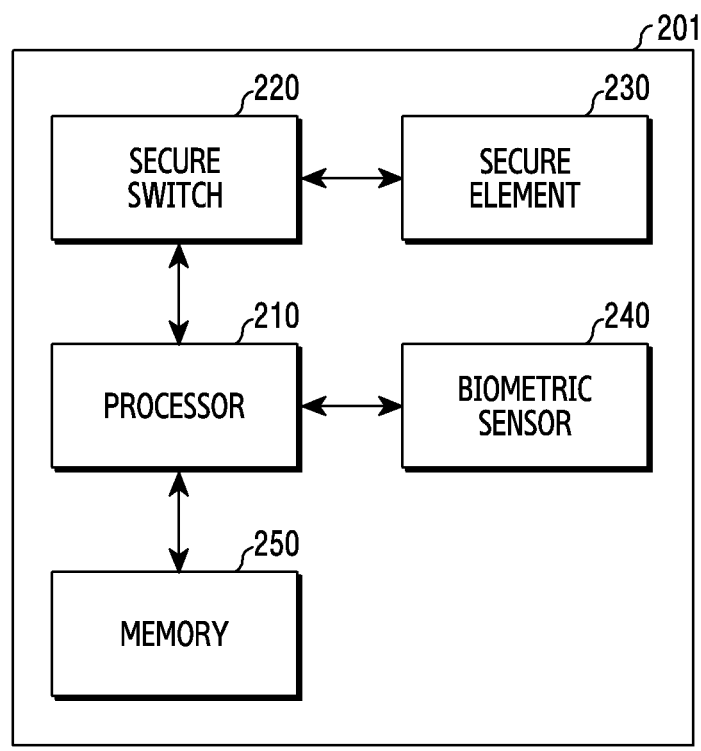
FIG. 2 is a block diagram illustrating an electronic device according to an embodiment.

FIG. 2 is a block diagram 200 illustrating an electronic device 201 according to an embodiment. In one embodiment, the electronic device 201 may correspond to the electronic device 101 of FIG. 1. In one embodiment, the electronic device 201 may be made by using the components of the electronic device 101 of FIG. 1.

In one embodiment, the electronic device 201 may include a processor 210, a secure switch 220, a secure element 230, a biometric sensor 240, a memory 250, or a combination thereof. In one embodiment, the processor 210, the biometric sensor 240, or the memory 250 may correspond to the processor 120, the sensor module 176, or the memory 130 of FIG. 1, respectively.

In one embodiment, the processor 210 may provide a first execution environment requiring a general security level and a second execution environment having a higher security level than the first execution environment. In one embodiment, the second execution environment may be an environment in which an application operates based on resources that are distinct from the resources allocated to the first execution environment. In one embodiment, the processor 210 may not allow access to the resources allocated to the second execution environment when an executed application is not permitted in the second execution environment. In one embodiment, the application that operates in the second execution environment may be referred to as a trusted application (TA). In one embodiment, the application that operates in the second execution environment may be referred to as a secure application. In one embodiment, the application that operates in the first execution environment may be referred to as a general application. In one embodiment, the first execution environment and the second execution environment may be implemented using components that are physically separated from the components of the first execution environment (e.g., the second execution environment may be provided through a secure processor distinct from the processor 210, when a plurality of processors 210 are provided and the second execution environment is provided through at least one processor 210 of the plurality of processors 210, or a combination thereof). Alternatively, the second execution environment may be separated from the first execution environment in software only. Or the physical and software separations may be used together. In one embodiment, the first execution environment may be an environment provided by a general operating system (OS) running on the processor 210, and the second execution environment may be an environment provided by a secure OS running on the processor 210.

The processor 210 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

In one embodiment, the processor 210 may sign a transaction using encryption information in the second execution environment that is distinct from the first execution environment in response to the signature request for the transaction in the first execution environment. In one embodiment, the processor 210 may identify a secret key based on the encryption information in the second execution environment, and may sign the transaction based on the identified secret key. In one embodiment, the encryption information may be a value capable of generating the secret key. In one embodiment, the encryption information may also be referred to as a root seed, master key, or entropy. In one embodiment, the signature for the transaction may refer to an operation of generating signature data using a user's private key for data to be included in the transaction.

In one embodiment, the processor 210 may display a screen for requesting (or guiding) a transition from a first state (e.g., open state) of the secure switch 220 to a second state (e.g., closed state) through a display device (e.g., the display device 160 of FIG. 1) in response to the signature request for the transaction in the first execution environment. In one embodiment, the processor 210 may acquire encryption information stored in the secure element 230 in the first execution environment in response to the transition of the secure switch 220 from the first state to the second state. In one embodiment, the processor 210 may transmit the encryption information acquired in the first execution environment to the second execution environment, and may sign the transaction based on the encryption information in the second execution environment. In one embodiment, the processor 210 may display a screen for requesting (or guiding) a transition from the second state (e.g., closed state) of the secure switch 220 to the first state (e.g., open state) through the display device 160 in response to the acquisition of the encryption information stored in the secure element 230. In one embodiment, the open state of the secure switch 220 may be a state in which the secure switch 220 electrically disconnects the processor 210 from the secure element 230. In one embodiment, the closed state of the secure switch 220 may be a state in which the secure switch 220 electrically connects the processor 210 and the secure element 230. In one embodiment, the open state may be referred to as a cut-off state or a disconnected state. In one embodiment, the closed state may be referred to as a connected state.

In one embodiment, the processor 210 may authenticate the user based on biometric information of the user obtained using the biometric sensor 240 in response to the signature request for the transaction in the first execution environment. In one embodiment, the biometric sensor 240 may include a fingerprint sensor, an iris sensor, a vein sensor, a face recognition sensor, or a combination thereof.

In one embodiment, the processor 210 may perform authentication based on user's authentication information obtained using an input device (e.g., the input device 150 of FIG. 1) in response to the signature request for the transaction in the first execution environment. In one embodiment, the user's authentication information may include a password, a pattern, a personal identification number (PIN), or a combination thereof.

In one embodiment, the processor 210 may perform authentication based on the user's biometric information, the user's authentication information, or a combination thereof in the second execution environment in response to the signature request for the transaction in the first execution environment.

In one embodiment, the processor 210 may sign the transaction based on the encryption information in the second execution environment in response to the authentication on the user based on the user's biometric information, the user's authentication information, or a combination thereof in the second execution environment.

In one embodiment, the processor 210 may use a communication circuit (e.g., the communication module 190 of FIG. 1) to send the transaction and the signature for the transaction to electronic devices (e.g., the electronic devices 102 and 104, and the server 108 of FIG. 1) which are participating in a distributed network (e.g., a blockchain network) in the first execution environment.

In one embodiment, the secure switch 220 may be implemented as a physical switch. In one embodiment, the secure switch 220 may have a first state and a second state. In one embodiment, the first state may be a state in which the secure switch 220 electrically disconnects the processor 210 from the security element 230, and the second state may be a state in which the secure switch 220 electrically connects the processor 210 and the secure element 230. In one embodiment, the secure switch 220 may be implemented based on at least one type of switch such as button, toggle, wheel, or rotary. However, this is only an example, and any configuration that is capable of alternating between the first state and the second state by an external force may be implemented as the secure switch 220. In one embodiment, the secure switch 220 may be a switch having a normally open state which changes from the first state to the second state by an external force acting on the secure switch 220 and changes from the second state to the first state when the external force acting on the secure switch 220 is released.

In one embodiment, the secure element 230 may store encryption information, a secret key, a private key, or a combination thereof. In one embodiment, the secure element 230 may include the user's fingerprint information, iris information, face information, or a combination thereof. In one embodiment, the secure element 230 may include the user's password (e.g., a password for logging into a web page, a password for logging into an application), a credit card number, or a combination thereof. In one embodiment, the secure element 230 may store information requiring security. In one embodiment, the secure element 230 may also be referred to as a memory, a secure memory, or a secure circuit. In one embodiment, any component for storing information requiring security may be referred to as the secure element 230.

In one embodiment, the secure element 230 may be electrically connected to or disconnected from the processor 210 through the secure switch 220.

In one embodiment, the memory 250 may store data for a general operating system for providing the first execution environment, data for a secure operating system for providing the second execution environment, data for the operating system, programs, or applications suitable for the first execution environment, and data for the secure operating system, trusted programs, or trusted applications suitable for the second execution environment.

Figure 3:
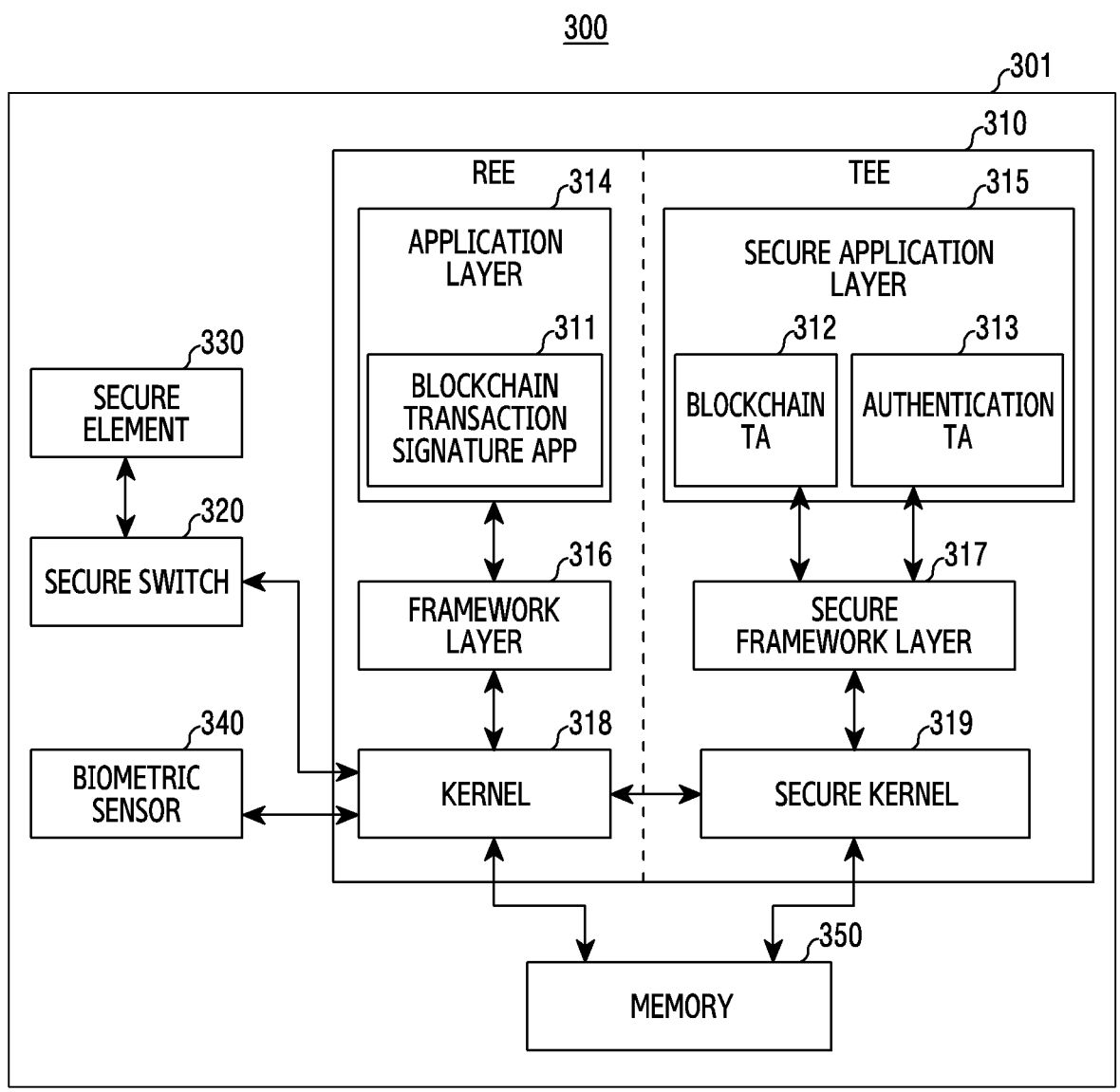
FIG. 3 is a block diagram illustrating an electronic device according to an embodiment.

FIG. 3 is a block diagram 300 illustrating an electronic device 301 according to an embodiment. In one embodiment, the electronic device 301 of FIG. 3 may correspond to the electronic device 101 of FIG. 1 or the electronic device 201 of FIG. 2. In one embodiment, the electronic device 301 of FIG. 3 may be made by using the components of the electronic device 101 of FIG. 1 or the electronic device 201 of FIG. 2.

In one embodiment, the electronic device 301 may include a processor 310, a secure switch 320, a secure element 330, a biometric sensor 340, and a memory 350. In one embodiment, the processor 310, the biometric sensor 340, or the memory 350 may correspond to the processor 120, the sensor module 176, or the memory 130 of FIG. 1, respectively. In one embodiment, the processor 310, the secure switch 320, the secure element 330, the biometric sensor 340, or the memory 350 may correspond to the processor 210, the secure switch 220, the secure element 230, the biometric sensor 240, or the memory 250 of FIG. 2, respectively.

In one embodiment, the processor 310 may be electrically connected to the secure switch 320, the biometric sensor 340, or the memory 350. In one embodiment, the processor 310 may be electrically connected to or disconnected from the secure element 330 depending on the state of the secure switch 320.

In one embodiment, the processor 310 may provide a rich execution environment (hereinafter, referred to as "REE") by driving a general operating system (not shown). In one embodiment, the processor 310 may provide a trusted execution environment (hereinafter, referred to as "TEE") by driving a secure operating system (not shown). In one embodiment, the TEE may have a higher security level than the REE.

In one embodiment, the REE of the processor 310 may include an application layer 314, a framework layer 316, or a kernel 318. In one embodiment, the application layer 314 of the REE may be a layer where a typical application is executed. In one embodiment, a blockchain transaction signature application 311 may be executed in the application layer 314 of the REE. In one embodiment, the framework layer 316 of the REE may be a layer for processing one or more work requests received from an application executed in the application layer 314, and the work requests may be prioritized. In one embodiment, the kernel 318 of the REE may be software modules that control or manage system resources used to execute operations or functions required by the applications of the application layer 314, programs of the framework layer 316, or a combination thereof. In one embodiment, the blockchain transaction signature application 311 may sign a transaction.

In one embodiment, the TEE of the processor 310 may include a secure application layer 315, a secure framework layer 317, or a secure kernel 319. In one embodiment, the secure application layer 315 of the TEE may be a layer in which an application having a higher security level than a typical application is executed. In one embodiment, the application executed in the TEE may be referred to as a trusted application (TA). In one embodiment, a blockchain trusted application 312 or an authentication trusted application 313 may be executed in the secure application layer 315 of the TEE. In one embodiment, the secure framework layer 317 of the TEE may be a layer for processing one or more work requests received from the TA executed in the secure application layer 315, and the work requests may be prioritized. In one embodiment, the secure kernel 319 of the TEE may be software modules that control or manage system resources used to execute operations or functions required by the trusted applications of the secure application layer 315, programs of the secure framework layer 317, or a combination thereof. In one embodiment, the blockchain trusted application 312 may be referred to as a signature secure application. In one embodiment, the authentication trusted application 313 may be referred to as an authentication secure application.

In one embodiment, the blockchain transaction signature application 311 executed in the application layer 314 of the REE may be an application for performing processing for a signature request for a transaction. In one embodiment, the transaction may be data generated in the electronic device and may be recorded in a block through a blockchain network. In one embodiment, the transaction may be composed of a portion representing the generated data and a portion representing signature. In one embodiment, the portion representing the generated data may include information about a nonce, a serial number of the transaction, a recipient's address, the amount of cryptocurrencies to be transmitted, or a combination thereof. However, this is only an example, and the transaction may include different information depending on the type of the blockchain or the configuration of the protocol. In one embodiment, the portion representing the signature may include data signed based on a private key corresponding to the user's account. In one embodiment, the signature data included in the transaction may be generated based on a predetermined signature algorithm (e.g., elliptic curve algorithm or Rivest-Shamir-Adleman (RSA) algorithm). In one embodiment, the signature data may be generated using the portion representing the generated data of the transaction and the user's private key based on a predetermined signature algorithm. In one embodiment, the signature data may correspond to a value generated based on the following code.

$$\text{Sig} = \text{sign}(\text{keccak256}(\text{rlp.encode}(\text{tx.raw})), \text{privateKey})$$

In one embodiment, the function of sign (A, B) may be a function for encrypting input A using input B based on a predetermined encryption algorithm. In one embodiment, the function of keccak256( ) may be a function for hash-encrypting an input. In one embodiment, the function of rlp.encode( ) may be a function for recursive length prefix (RLP)-encoding an input. In one embodiment, tx.raw may correspond to the portion representing the generated data of the transaction. In one embodiment, privateKey may be the user's private key. In one embodiment, participating nodes of the blockchain network may transmit cryptocurrency or may execute a contract corresponding to the transaction.

In one embodiment, the blockchain transaction signature application 311 may be an application that can access the TEE. In one embodiment, the signature request for the transaction may be generated through another application which is being executed in the REE.

In one embodiment, the processor 310 may request the execution of the blockchain trusted application 312 from the secure operating system (not shown) by using the blockchain transaction signature application 311 in response to the signature request for the transaction. In one embodiment, the processor 310 may transmit the execution request for the blockchain trusted application 312 to the secure operating system (not shown) through the framework layer 316.

In one embodiment, the processor 310 may execute the blockchain trusted application 312 in the TEE in response to the execution request for the blockchain trusted application 312. In one embodiment, the processor 310 may notify the blockchain transaction signature application 311 that the blockchain trusted application 312 is being executed, using the secure operating system (not shown) in response to the execution of the blockchain trusted application 312.

In one embodiment, the processor 310 may request a token from the blockchain trusted application 312 by using the blockchain transaction signature application 311 in response to the notification. In one embodiment, the processor 310 may transmit the request for the token to the blockchain trusted application 312 through the framework layer 316, the kernel 318, the secure kernel 319, or the secure framework layer 317 in response to the notification. In one embodiment, the token may be an arbitrary value. In one embodiment, the token may also be referred to as a nonce. In one embodiment, the token may be used for identification between the trusted applications 312 and 313 executed in the REE. In one embodiment, the token may be used to identify that a trusted application executed in the REE has performed a function designated in another trusted application. In one embodiment, the processor 310 may wrap the token based on identification information associated with the other trusted application (e.g., application ID of the other trusted application) so that only the other trusted application can confirm the token generated by the trusted application. In one embodiment, when the wrapped token is transmitted to the other trusted application, the processor 310 may perform a function requested by the trusted application in the other trusted application. In one embodiment, the processor 310 may wrap the token based on identification information associated with the trusted application (e.g., application ID of the trusted application) so that only the trusted application can confirm a result obtained by performing the function according to the request of the trusted application in the other trusted application. In one embodiment, when the wrapped token is transmitted to the trusted application based on the identification information associated with the trusted application, it is determined that the trusted application has performed the function requested by the other trusted application based on the corresponding token. In one embodiment, encryption of the token may also be referred to as wrapping. In one embodiment, decryption of the encryption token may be referred to as unwrapping.

In one embodiment, the processor 310 may request authentication of the user from the authentication trusted application 313 which is executed in the TEE, using the blockchain transaction signature application 311 in response to the signature request for the transaction. In one embodiment, after the blockchain transaction signature application 311 receives the token, the processor 310 may request the authentication of the user from the authentication trusted application 313 using the blockchain transaction signature application 311.

In on embodiment, the processor 310 may authenticate the user using the authentication trusted application 313 in response to the authentication request for the user. In one embodiment, the processor 310 may use the authentication trusted application 313 to authenticate the user based on the user's biometric information, the user's authentication information, or a combination thereof. In one embodiment, the processor 310 may transmit data indicating the authentication result to the blockchain transaction signature application 311 by using the authentication trusted application 313. In one embodiment, the data indicating the authentication result may include an encryption token obtained by encrypting the token. In one embodiment, encryption of the token may also be referred to as wrapping In one embodiment, the processor 310 may display a first screen generated using the blockchain transaction signature application 311 through the display device 160 in response to the signature request for the transaction. In one embodiment, the processor 310 may request the execution of the blockchain trusted application 312 from the secure operating system (not shown), and at the same time, may display the first screen through the display device 160 therebefore or thereafter. In one embodiment, the first screen may be a screen indicating a request to the user for a switching input to the secure switch 320. In one embodiment, the processor 310 may display the first screen generated using a user interface trusted application (not shown) executed in the TEE through the display device 160 in response to the signature request for the transaction.

In one embodiment, the processor 310 may use the blockchain transaction signature application 311 to acquire the encryption information stored in the secure element 330 in response to a transition of the secure switch 320 from a first state (e.g., electrical open state on a circuit diagram) to a second state (e.g., electrical closed state on the circuit diagram). In one embodiment, the processor 310 may store the encryption information acquired through the blockchain transaction signature application 311 in an area allocated to the blockchain transaction signature application 311 in the areas of the memory 350. In one embodiment, the area of the memory 350 allocated to the blockchain transaction signature application 311 may be an area of volatile memory (e.g., the volatile memory 132 of FIG. 1).

In one embodiment, when the encryption information is acquired, the processor 310 may use the blockchain transaction signature application 311 to request the signature for the transaction from the blockchain trusted application 312. In one embodiment, when the encryption information is acquired and the user is authenticated, the processor 310 may use the blockchain transaction signature application 311 to request the signature for the transaction from the blockchain trusted application 312. In one embodiment, the signature request for the transaction may include data indicating the transaction, encryption information, an encryption token, or a combination thereof.

In one embodiment, the processor 310 may sign the transaction through the blockchain trusted application 312 based on the encryption information. In one embodiment, the processor 310 may transmit data indicating the signature for the transaction to the blockchain transaction signature application 311 through the blockchain trusted application 312.

In one embodiment, when the encryption information is acquired, the processor 310 may display a second screen generated through the blockchain transaction signature application 311 through the display device 160. In one embodiment, the second screen may be a screen indicating a request to the user to release the switching input to the secure switch 320.

In one embodiment, the processor 310 may send the data indicating the signature for the transaction to the electronic devices (e.g., the electronic devices 102 and 104 and the server 108) which participate in the distributed network, through the blockchain transaction signature application 311.

Figure 4:
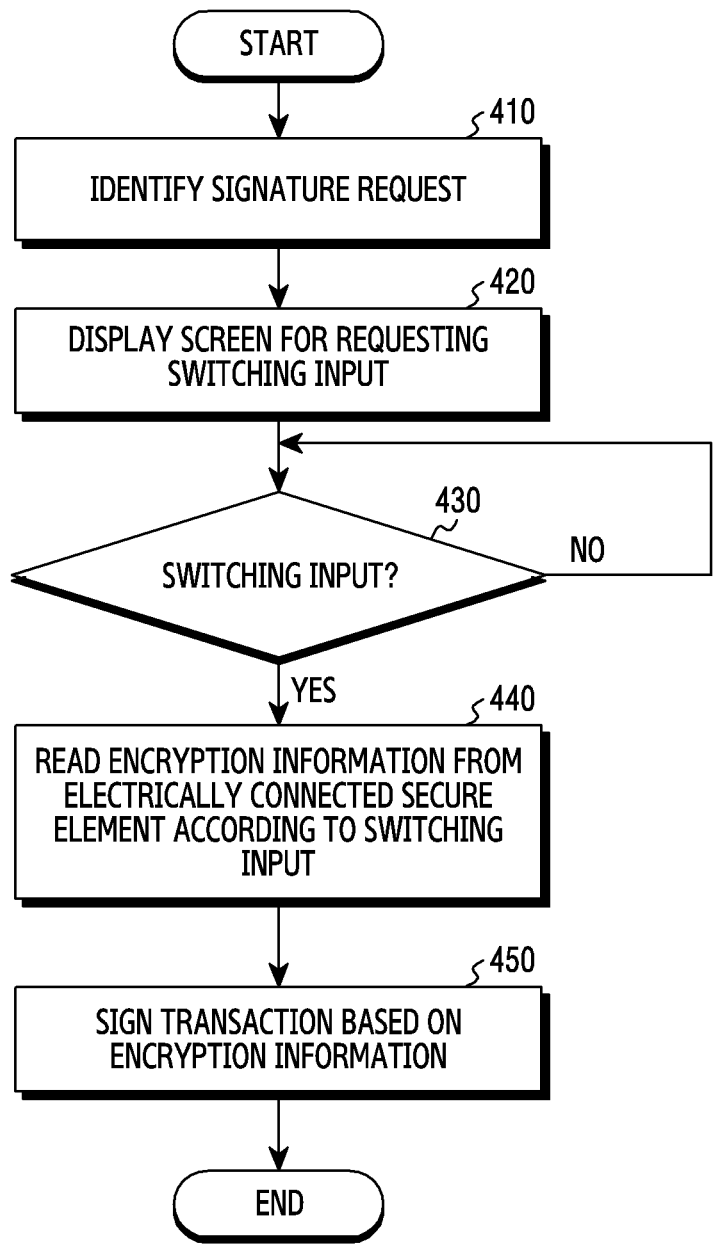
FIG. 4 is a flowchart illustrating the operation of an electronic device according to an embodiment.

FIG. 4 is a flowchart 400 illustrating the operation of an electronic device (e.g., the electronic device 201 of FIG. 2) according to an embodiment. In one embodiment, the description of FIG. 4 may be made using the components of the electronic device 101 of FIG. 1, the electronic device 201 of FIG. 2, or the electronic device 301 of FIG. 3.

Referring to FIG. 4, in operation 410, a processor (e.g., the processor 310 of FIG. 3) of an electronic device (e.g., the electronic device 301 of FIG. 3) may identify a signature request. In one embodiment, the processor 310 may identify a signature request for a transaction of an application which is being executed in a first execution environment (e.g., REE). In one embodiment, the processor 310 may execute an application for processing the signature request (e.g., the blockchain transaction signature application 311 of FIG. 3) in the first execution environment in response to identifying the signature request for the transaction.

Referring to FIG. 4, in operation 420, the processor 310 of the electronic device 301 may use a display device (e.g., the display device 160 of FIG. 1) to display a screen requesting a switching input. In one embodiment, the processor 310 may display a screen generated by the blockchain transaction signature application 311 using the display device 160 in response to the signature request.

Referring to FIG. 4, in operation 430, the processor 310 may confirm a user input for changing the state of a secure switch (e.g., the secure switch 320 of FIG. 3). In one embodiment, the processor 310 may confirm the user input for changing the state of the secure switch 320 from a first state (e.g., open state) to a second state (e.g., closed state). In one embodiment, the first state (e.g., open state) may be a state in which the secure switch 320 electrically disconnects the processor 310 from a secure element (e.g., the secure element 330 of FIG. 3), and the second state (e.g., the closed state) may be a state in which the secure switch 320 electrically connects the processor 310 and the secure element (e.g., the secure element 330 of FIG. 3).

In one embodiment, when the user's input for changing the state of the secure switch 320 is confirmed in operation 430, the processor 310 may perform operation 440. In one embodiment, when the user's input for changing the state of the secure switch 320 is not confirmed in operation 430, the processor 310 may remain at operation 430.

Referring to FIG. 4, in operation 440, the processor 310 may acquire encryption information from the electrically connected secure element 330 according to the switching input. In one embodiment, the processor 310 may acquire encryption information stored in the secure element 330 using the blockchain transaction signature application 311. In one embodiment, the processor 310 may authenticate the user (e.g., biometric authentication), and may acquire the encryption information from the secure element 330 when the authentication of the user is successful.

Referring to FIG. 4, in operation 450, the processor 310 may sign first data to be included in the transaction (e.g., a portion representing information or payload of the transaction) based on the encryption information. In one embodiment, the processor 310 may generate the transaction by combining the first data with second data (e.g., signature data) generated by signing the first data. In one embodiment, the processor 310 may send the generated transaction to electronic devices (e.g., the electronic devices 102 and 104 and the server 108 of FIG. 1) participating in a blockchain network. In one embodiment, the electronic devices participating in the blockchain network may generate a block including the transaction. In one embodiment, when the generated block is verified by the electronic devices participating in the blockchain network, the generated block may be recorded in the blockchain network. In one embodiment, the processor 310 may sign the transaction based on the encryption information by using a signature application (e.g., the blockchain trusted application 312 of FIG. 3) which is executed in a second execution environment (e.g., TEE).

Figure 5:
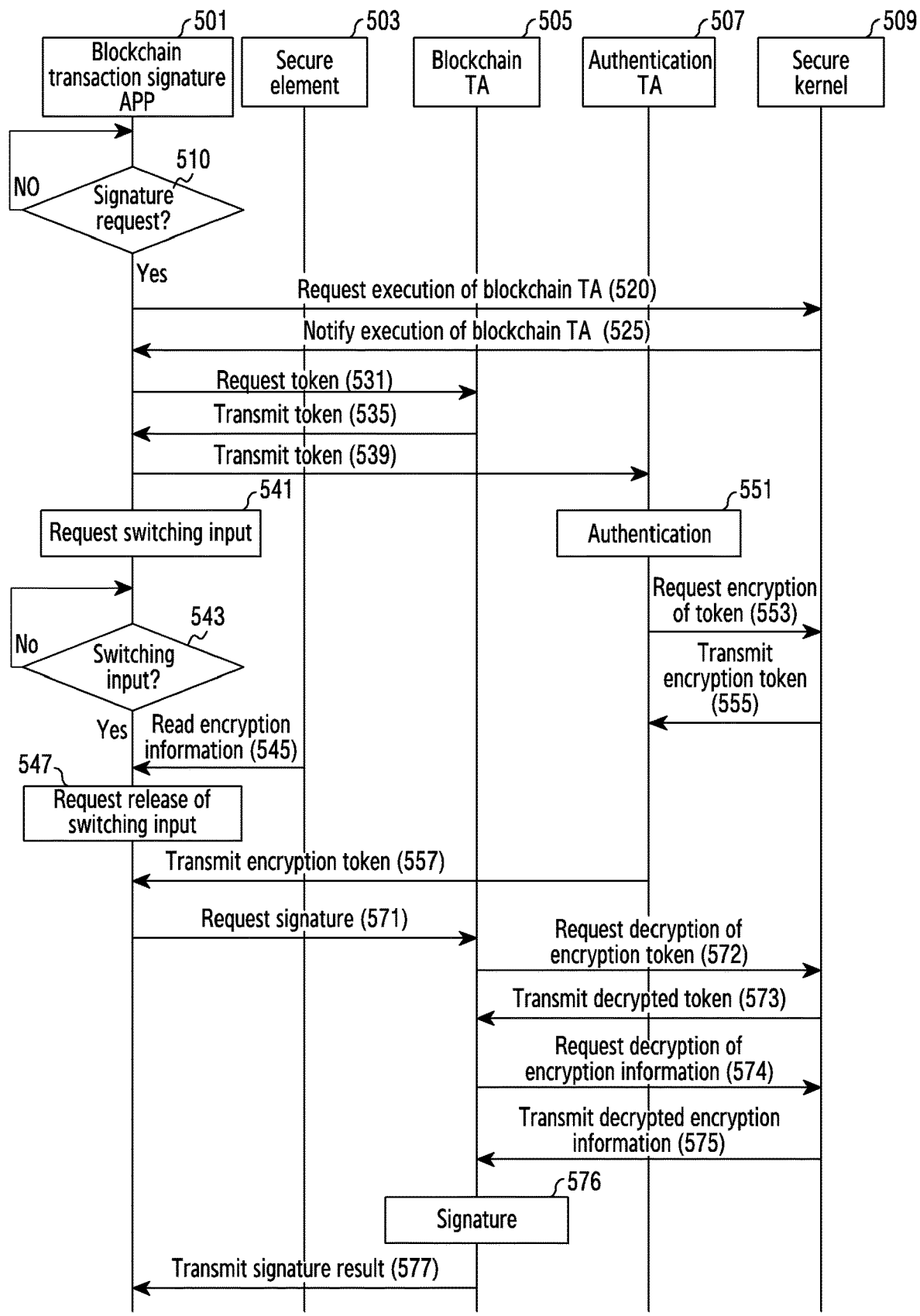
FIG. 5 is a flowchart illustrating the operation of an electronic device according to an embodiment.

FIG. 5 is a flowchart 500 illustrating the operation of an electronic device (e.g., the electronic device 201 of FIG. 2) according to an embodiment. In one embodiment, a blockchain transaction signature application 501, a secure element 503, a blockchain trusted application 505, an authentication trusted application 507, or a secure kernel 319 of FIG. 5 may correspond to the transaction signature application 311, the secure element 330, the blockchain trusted application 312, or the authentication trusted application 313 of FIG. 3, respectively. In one embodiment, a processor (e.g., the processor 310 of FIG. 3) may execute the blockchain transaction signature application 501 in a REE, and may execute the blockchain trusted application 505 or the authentication trusted application 507 in a TEE. In one embodiment, a secure operating system may include a secure kernel 509 and a secure framework layer (e.g., the secure framework layer 317 in FIG. 3). In one embodiment, operations performed by the secure kernel 509 may be understood to be performed by the secure operating system. In one embodiment, the description of FIG. 5 may be made using the components of the electronic device 101 of FIG. 1, the electronic device 201 of FIG. 2, or the electronic device 301 of FIG. 3.

Referring to FIG. 5, in operation 510, the blockchain transaction signature application 501 may identify a signature request for a transaction. In one embodiment, the blockchain transaction signature application 501 may identify a signature request for a transaction generated by an application which is being executed in the REE.

In one embodiment, the blockchain transaction signature application 501 may perform operation 520 when identifying the signature request ("YES" determination). In one embodiment, the blockchain transaction signature application 501 may remain at operation 510 when the signature request is not identified ("NO" determination).

In operation 520, the blockchain transaction signature application 501 may request execution of the blockchain trusted application 505 from the secure kernel 509. In one embodiment, when the signature request is identified, the blockchain transaction signature application 501 may request the execution of the blockchain trusted application 505 from the secure kernel 509.

In one embodiment, the secure kernel 509 may execute the blockchain trusted application 505 in the TEE in response to the request of the blockchain transaction signature application 501 for the execution of the blockchain trusted application 505.

In operation 525, the secure kernel 509 may notify the blockchain transaction signature application 501 that the blockchain trusted application 505 has been executed.

In operation 531, the blockchain transaction signature application 501 may request a token from the blockchain trusted application 505. In one embodiment, the blockchain transaction signature application 501 may request the token from the blockchain trusted application 505 in response to the execution notification for the blockchain trusted application 505 from the secure kernel 509.

In operation 535, the blockchain trusted application 505 may generate the token in response to the token request from the blockchain transaction signature application 501, and may transmit the generated token to the blockchain transaction signature application 501. In one embodiment, the blockchain trusted application 505 may generate the token having an arbitrary value. In one embodiment, the token generated by the blockchain trusted application 505 may be used in a procedure for authenticating the user.

In operation 539, the blockchain transaction signature application 501 may transmit the token to the authentication trusted application 507. In one embodiment, the blockchain transaction signature application 501 may request the authentication of the user by transmitting the token to the authentication trusted application 507. In one embodiment, the blockchain transaction signature application 501 may request the authentication of the user separately from transmitting the token to the authentication trusted application 507.

In operation 541, the blockchain transaction signature application 501 may display a screen indicating a request for a user input from the user to turn on the secure switch (e.g., the secure switch 320 of FIG. 3).

In operation 543, the blockchain transaction signature application 501 may identify a switching input to the secure switch 320. In one embodiment, the blockchain transaction signature application 501 may identify the switching input based on a transition of the secure switch 320 from a first state (e.g., open state) to a second state (e.g., closed state). In operation 543, the blockchain transaction signature application 501 may perform operation 545 when the switching input is identified ("YES" determination). In one embodiment, the blockchain transaction signature application 501 may remain at operation 543 when the switching input is not identified ("NO" determination).

In one embodiment, the user may enter a user input (e.g., a touch input) or the like through a screen in operation 541. In one embodiment, when it is determined that the user has authorized the user input for turning on or closing the secure switch 320, the processor (e.g., the processor 310 of FIG. 3) may perform the operation of acquiring the user's authentication information (e.g., biometric information or password).

In operation 545, the blockchain transaction signature application 501 may acquire encryption information stored in the secure element 503 based on the transition of the secure switch 320 from the first state to the second state. In one embodiment, when the encryption information is not acquired from the secure element 503 while the user has closed the secure switch 320, the blockchain transaction signature application 501 may display, to the user, the screen indicating the request for the user input for turning on the secure switch 320 again. In one embodiment, the encryption information may be a root seed for obtaining a private key through unwrapping.

In operation 547, the blockchain transaction signature application 501 may display, to the user, a screen indicating a request to release the switching input to the secure switch 320 in response to the acquisition of the encryption information. In one embodiment, when the user releases the secure switch 320, the processor 310 and the secure element 503 may be electrically disconnected, so that the blockchain transaction signature application 501 cannot acquire the encryption information from the secure element 503.

In one embodiment, in FIG. 5, operations 541, 543, and 545 are illustrated as being executed after operations 531, 535, and 539, but this is only an example, and operations 541, 543, and 545 may be executed prior to or concurrently with operations 531, 535, and 539.

In operation 551, the authentication trusted application 507 may authenticate the user in response to an authentication request of the blockchain transaction signature application 501. In one embodiment, the authentication trusted application 507 may perform authentication based on the user's biometric information, the user's authentication information, or a combination thereof. In one embodiment, the authentication trusted application 507 may authenticate the user based on the user's biometric information obtained using a biometric sensor (e.g., the biometric sensor 240 of FIG. 2). In one embodiment, the biometric sensor 240 may include a fingerprint sensor, an iris sensor, a vein sensor, a face recognition sensor, or a combination thereof. In one embodiment, the authentication trusted application 507 may perform authentication based on the user's authentication information obtained using an input device (e.g., the input device 150 of FIG. 1). In one embodiment, the user's authentication information may include a password, a pattern, a PIN, or a combination thereof.

In operation 553, when the authentication of the user is completed, the authentication trusted application 507 may request encryption of a token from the secure kernel 509. In one embodiment, the encryption of the token may also be referred to as wrapping the token.

In operation 555, the secure kernel 509 may encrypt the token received from the authentication trusted application 507 and may transmit the encrypted token to the authentication trusted application 507.

In operation 557, the authentication trusted application 507 may transmit the encrypted token to the blockchain transaction signature application 501. In one embodiment, the blockchain transaction signature application 501 may identify that the authentication of the user has been completed based on the encrypted token.

In one embodiment, operations 541, 543, and 545 of FIG. 5 may be executed prior to, later, or concurrently with operations 551, 553, 555, and 557.

In operation 571, the blockchain transaction signature application 501 may request a signature for the transaction from the blockchain trusted application 505. In one embodiment, the blockchain transaction signature application 501 may transmit, to the blockchain trusted application 505, a signature request for generating data indicating the transaction, encryption information, an encryption token, or a combination thereof as a transaction to be transmitted through a blockchain network.

In operation 572, the blockchain trusted application 505 may request decryption of the encryption token from the secure kernel 509. In one embodiment, the decryption of the encryption token may also be referred to as unwrapping of the encryption token.

In operation 573, the secure kernel 509 may decrypt the encryption token received from the blockchain trusted application 505 and may transmit the decrypted token to the blockchain trusted application 505.

In operation 574, the blockchain trusted application 505 may request the decryption of the encryption information from the secure kernel 509. In one embodiment, the blockchain trusted application 505 may request the decryption of the encryption information from the secure kernel 509 when the decrypted token matches a token issued by itself in operation 535. In one embodiment, the decryption of the encryption information may be to obtain a private key from the root seed. In one embodiment, the decryption of the encryption information may also be referred to as unwrapping of the encryption information.

In operation 575, the secure kernel 509 may decrypt the encryption information received from the blockchain trusted application 505 and may transmit the decrypted encryption information to the blockchain trusted application 505. In one embodiment, the secure kernel 509 may obtain the user's private key (or secret key) based on the received encryption information. In one embodiment, the secure kernel 509 may obtain the user's private key (or secret key) by decrypting the received encryption information. In one embodiment, the secure kernel 509 may decrypt the received encryption information and may generate the user's private key (or secret key) based on the decrypted encryption information. In one embodiment, the secure kernel 509 may transmit the generated (or obtained) user's private key (or secret key) to the blockchain trusted application 505.

In operation 576, the blockchain trusted application 505 may sign the transaction. In one embodiment, the blockchain trusted application 505 may sign the transaction based on the encryption information.

In one embodiment, the blockchain trusted application 505 may use the decrypted encryption information to sign the transaction.

In operation 577, the blockchain trusted application 505 may transmit the result obtained by signing the transaction to the blockchain transaction signature application 501.

In one embodiment, the blockchain transaction signature application 501 may notify an application having generated the signature request for the transaction that the signature has been completed. In one embodiment, the blockchain transaction signature application 501 may send the signature result for the transaction to electronic devices (e.g., the electronic devices 102 and 104 and the server 108 of FIG. 1) participating in the distributed network.

Figure 6:
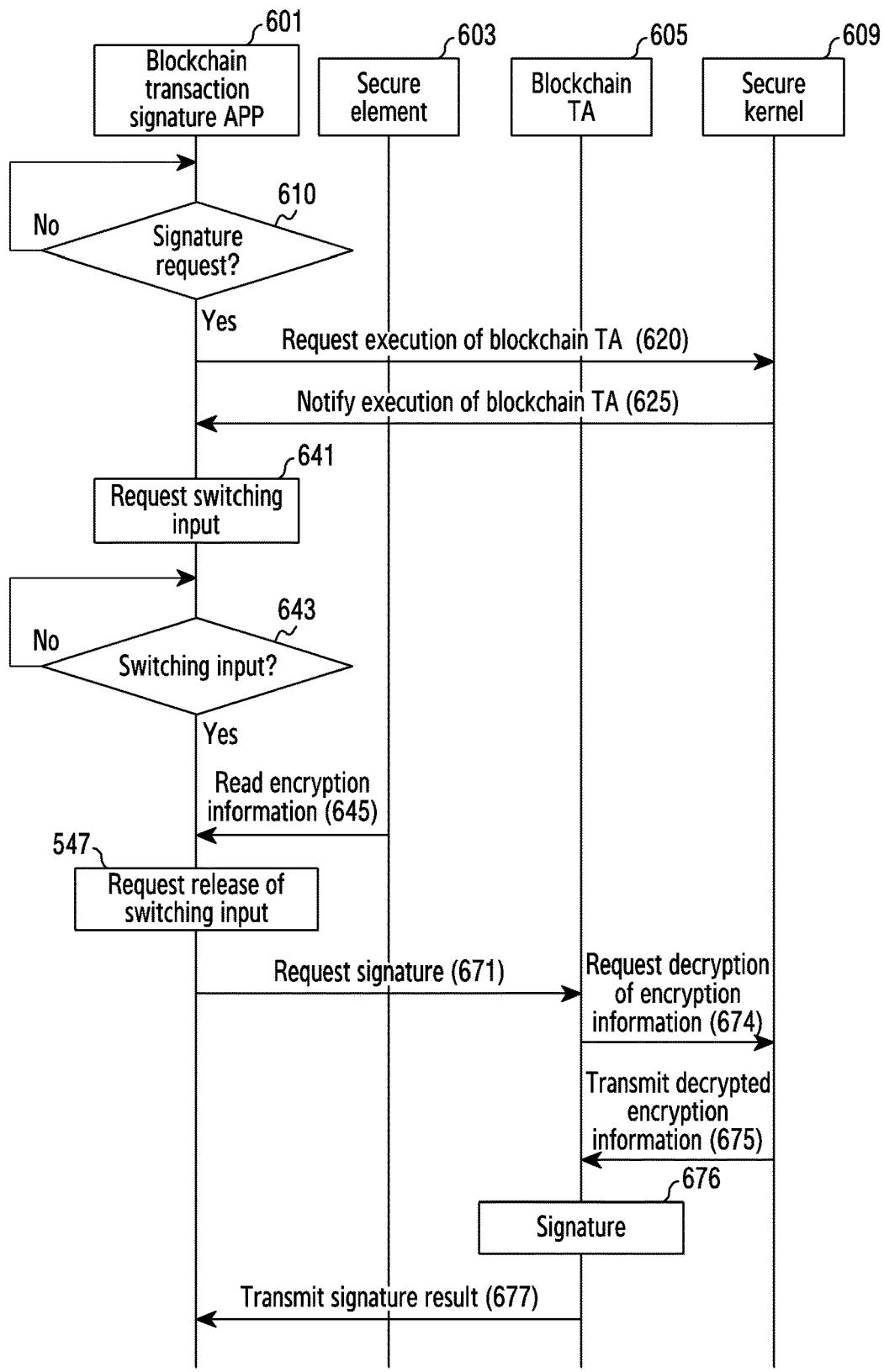
FIG. 6 is a flowchart illustrating the operation of an electronic device according to an embodiment.

FIG. 6 is a flowchart 600 illustrating the operation of an electronic device (e.g., the electronic device 201 of FIG. 2) according to an embodiment. In one embodiment, a blockchain transaction signature application 601, a secure element 603, a blockchain trusted application 605, or a secure kernel 609 of FIG. 6 may correspond to the blockchain transaction signature application 501, the secure element 503, the blockchain trusted application 505, or the secure kernel 509 of FIG. 5, respectively. In one embodiment, a processor (e.g., the processor 310 of FIG. 3) may execute the blockchain transaction signature application 601 in a REE and may execute the blockchain trusted application 605 in a TEE. In one embodiment, a secure operating system may include a secure kernel 609 and a secure framework layer (e.g., the secure framework layer 317 in FIG. 3). In one embodiment, operations performed by the secure kernel 609 may be understood to be performed by the secure operating system. In one embodiment, the description of FIG. 6 may be made using the components of the electronic device 101 of FIG. 1, the electronic device 201 of FIG. 2, or the electronic device 301 of FIG. 3.

In FIG. 6, in comparison with FIG. 5, operations 531, 535, 539, 551, 553, 555, 557, 572, and 573 related to the authentication of the user of FIG. 5 may be omitted. In one embodiment, operations 610, 620, 625, 641, 643, 645, 647, 671, 674, 675, 676, and 677 of FIG. 6 may correspond to operations 510, 520, 525, 541, 543, 545, 547, 571, 574, 575, 576, and 577 of FIG. 5, respectively.

In operation 610, the blockchain transaction signature application 601 may identify a signature request for a transaction. In one embodiment, the blockchain transaction signature application 601 may perform operation 620 when the signature request is identified ("YES" determination). In one embodiment, the blockchain transaction signature application 601 may remain at operation 610 when the signature request is not identified ("NO" determination).

In operation 620, the blockchain transaction signature application 601 may request the execution of the blockchain trusted application 605 from the secure kernel 609. In one embodiment, the secure kernel 609 may execute the blockchain trusted application 605 in the TEE, and may notify the blockchain transaction signature application 601 that the blockchain trusted application 605 has been executed.

In operation 625, the secure kernel 609 may notify the blockchain transaction signature application 601 that the blockchain trusted application 605 has been executed.

In operation 641, the blockchain transaction signature application 601 may display, to the user, a screen indicating a request for a switching input to a secure switch (e.g., the secure switch 320 of FIG. 3).

In operation 643, the blockchain transaction signature application 601 may identify the switching input to the secure switch 320. In one embodiment, the blockchain transaction signature application 601 may identify the switching input based on a transition of the secure switch 320 from a first state (e.g., open state) to a second state (e.g., closed state). According to one embodiment of the disclosure, for the application or program identifying the input for the state transition of the secure switch 320 is not limited to the blockchain transaction signature application, and the identification may be performed by other applications according to various other embodiments of the disclosure.

In operation 643, the blockchain transaction signature application 601 may perform operation 645 when the switching input is identified ("YES" determination). In one embodiment, the blockchain transaction signature application 601 may remain at operation 643 when the switching input is not identified ("NO" determination).

In operation 645, the blockchain transaction signature application 601 may acquire encryption information stored in the secure element 603 based on the transition of the secure switch 320 from the first state to the second state. In one embodiment, at operation 547, the blockchain transaction signature application 601 may display, to the user, a screen indicating a request for releasing the switching input to the secure switch 320 in response to the acquisition of the encryption information.

In operation 671, the blockchain transaction signature application 601 may request a signature for the transaction from the blockchain trusted application 605. In one embodiment, the blockchain transaction signature application 601 may transmit the signature request for the transaction including data indicating the transaction, encryption information, an encryption token, or a combination thereof to the blockchain trusted application 605.

In operation 674, the blockchain trusted application 605 may request decryption of the encryption information from the secure kernel 609. In one embodiment, the decryption of the encryption information may be to obtain a private key from the root seed. In one embodiment, the decryption of the encryption information may also be referred to as unwrapping of the encryption information.

In operation 675, the secure kernel 609 may decrypt the encryption information received from the blockchain trusted application 605, and may transmit the decrypted encryption information to the blockchain trusted application 605. In one embodiment, the secure kernel 609 may obtain the user's private key (or secret key) based on the received encryption information. In one embodiment, the secure kernel 609 may obtain the user's private key (or secret key) by decrypting the received encryption information. In one embodiment, the secure kernel 609 may decrypt the received encryption information and may generate the user's private key (or secret key) based on the decrypted encryption information. In one embodiment, the secure kernel 609 may transmit the generated user's private key (or secret key) to the blockchain trusted application 605.

In operation 676, the blockchain trusted application 605 may sign the transaction. In one embodiment, the blockchain trusted application 605 may sign the transaction based on the encryption information. In one embodiment, the blockchain trusted application 605 may use the decrypted encryption information to sign the transaction.

In operation 677, the blockchain trusted application 605 may transmit the result of the signature for the transaction to the blockchain transaction signature application 601.

In one embodiment, the blockchain transaction signature application 601 may notify an application having generated the signature request for the transaction (which may be various programs such as a web application, a server application, etc.) that the signature has been completed. According to an embodiment of the disclosure, the signature request for the transaction may be obtained from an external machine. For example, a second electronic device connected to the electronic device via a network may request the signature request from the electronic device, which has enhanced security features, and the electronic device may transmit the signature request result to the second electronic device. In one embodiment, the blockchain transaction signature application 601 may send the signature result for the transaction to electronic devices (e.g., the electronic devices 102 and 104 and the server 108 of FIG. 1) participating in the distributed network.

Figure 7:
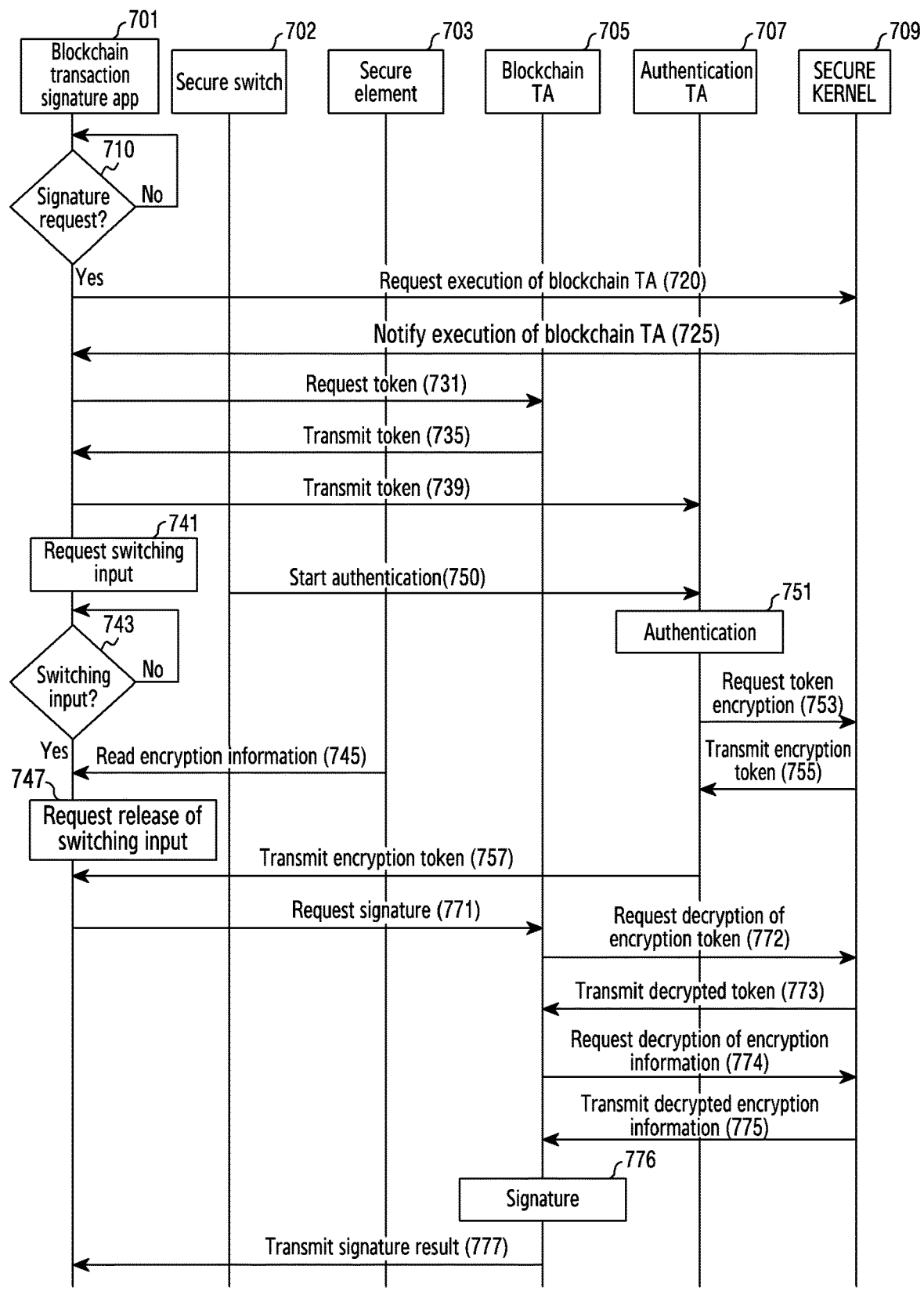
FIG. 7 is a flowchart illustrating the operation of an electronic device according to an embodiment.

FIG. 7 is a flowchart illustrating the operation of an electronic device (e.g., the electronic device 201 of FIG. 2) according to an embodiment. In one embodiment, FIG. 7 is the flowchart 700 illustrating the operation of an electronic device (e.g., the electronic device 201 of FIG. 2) in which a biometric sensor (e.g., the sensor module 176 of FIG. 1, the biometric sensor 240 of FIG. 2, or the biometric sensor 340 of FIG. 3) is located on a contact surface of a secure switch 702. In one embodiment, the secure switch 702 and the biometric sensor may be integrally configured.

In one embodiment, a blockchain transaction signature application 701, a secure element 703, a blockchain trusted application 705, an authentication trusted application 707, or a secure kernel 709 of FIG. 7 may correspond to the blockchain transaction signature application 501, the secure element 503, the blockchain trusted application 505, the authentication trusted application 507, or the secure kernel 509 of FIG. 5, respectively. In one embodiment, a processor (e.g., the processor 310 of FIG. 3) may execute the blockchain transaction signature application 701 in a REE and may execute the blockchain trusted application 705 or the authentication trusted application 707 in a TEE. In one embodiment, the secure operating system may include a secure kernel 709 and a secure framework layer (e.g., the secure framework layer 317 in FIG. 3). In one embodiment, operations performed by the secure kernel 709 may be understood to be performed by the secure operating system. In one embodiment, the description of FIG. 7 may be performed using the components of the electronic device 101 of FIG. 1, the electronic device 201 of FIG. 2, or the electronic device 301 of FIG. 3.

In FIG. 7 in comparison with FIG. 5, operation 750 associated with authentication of a user of FIG. 7 may be further included. Operations 710, 720, 725, 731, 735, 739, 741, 743, 745, 747, 751, 753, 755, 757, 771, 772, 773, 774, 775, 776, and 777 of FIG. 7 may correspond to operations 510, 520, 525, 531, 535, 539, 541, 543, 545, 547, 551, 553, 555, 557, 571, 572, 573, 574, 575, 576, and 577 of FIG. 5, respectively.

In operation 710, the blockchain transaction signature application 701 may identify a signature request for a transaction.

In one embodiment, the blockchain transaction signature application 701 may perform operation 720 when the signature request is identified ("YES" determination). In one embodiment, the blockchain transaction signature application 701 may remain at operation 710 when the signature request is not identified ("NO" determination).

In operation 720, the blockchain transaction signature application 701 may request execution of the blockchain trusted application 705 from the secure kernel 709. In one embodiment, the secure kernel 709 may execute the blockchain trusted application 705 in the TEE in response to the execution request for the blockchain trusted application 705 from the blockchain transaction signature application 701, and may notify the blockchain transaction signature application 701 that the blockchain trusted application 705 has been executed.

In operation 725, the secure kernel 709 may notify the blockchain transaction signature application 701 that the blockchain trusted application 505 has been executed.

In operation 731, the blockchain transaction signature application 701 may request a token from the blockchain trusted application 705. In operation 735, the blockchain trusted application 705 may generate the token in response to the token request from the blockchain transaction signature application 701, and may transmit the generated token to the blockchain transaction signature application 701.

In operation 739, the blockchain transaction signature application 701 may transmit the token to the authentication trusted application 707. In one embodiment, the blockchain transaction signature application 701 may request authentication of the user by transmitting the token to the authentication trusted application 707. In one embodiment, the blockchain transaction signature application 701 may request authentication of the user separately from transmitting the token to the authentication trusted application 507.

In operation 741, the blockchain transaction signature application 701 may request a switching input from the user by displaying, to the user, a screen indicating a request for a switching input to the secure switch 702.

In operation 743, the blockchain transaction signature application 701 may identify the switching input to the secure switch 702. In one embodiment, the blockchain transaction signature application 701 may identify the switching input based on a transition of the secure switch 702 from a first state (e.g., open state) to a second state (e.g., closed state).

In operation 743, the blockchain transaction signature application 701 may perform operation 745 when the switching input is identified ("YES" determination). In one embodiment, the blockchain transaction signature application 701 may remain at operation 743 when the switching input is not identified ("NO" determination).

In one embodiment, in operation 741, the user may perform a user input (e.g., touch input) or the like on a display screen. In one embodiment, when it is determined that the user has authorized the user input for turning on the secure switch 320, a processor (e.g., the processor 310 of FIG. 3) may proceed with the operation of obtaining user's authentication information (e.g., using biometric information or a password).

In operation 745, the blockchain transaction signature application 701 may acquire encryption information stored in the secure element 703 based on the transition of the secure switch 702 from the first state to the second state. In one embodiment, when the encryption information is not acquired from the secure element 703 while the user has closed the secure switch 702, the blockchain transaction signature application 701 may display, to the user, the screen indicating the request for the user input for turning on the secure switch 320 again. In one embodiment, the encryption information may be a root seed for obtaining a private key through unwrapping.

In operation 747, the blockchain transaction signature application 701 may display, to the user, a screen indicating a request to release the switching input to the secure switch 702 in response to the acquisition of the encryption information. In one embodiment, when the user releases the press on the secure switch 320, the processor 310 and the secure element 703 may be electrically disconnected, so that the blockchain transaction signature application 701 cannot further acquire the encryption information from the secure element 703.

In operation 750, as the secure switch 702 is switched by the user input, an authentication start signal generated by the secure switch 702 may be transmitted to the authentication trusted application 707. In one embodiment, as the user input is applied to the secure switch 702, the biometric sensor located on the contact surface of the secure switch 702 may identify the user's contact, and the biometric sensor may transmit the generated authentication start signal to the authentication trusted application 707 in response to the identification.

In operation 751, the authentication trusted application 707 may authenticate the user in response to an authentication request of the blockchain transaction signature application 701. In operation 751, the authentication trusted application 707 may initiate authentication of the user based on the authentication start signal.

In operation 753, when the authentication of the user is completed, the authentication trusted application 707 may request encryption of a token from the secure kernel 709. In one embodiment, the encryption of the token may also be referred to as wrapping for the token.

In operation 755, the secure kernel 709 may encrypt the token received from the authentication trusted application 707 and may transmit the encrypted token to the authentication trusted application 707.

In operation 757, the authentication trusted application 707 may transmit the encrypted token to the blockchain transaction signature application 701. In one embodiment, the blockchain transaction signature application 701 may identify that the authentication of the user has been completed based on the encrypted token.

In operation 771, the blockchain transaction signature application 701 may request a signature for the transaction from the blockchain trusted application 705.

In operation 772, the blockchain trusted application 705 may request decryption of the encryption token from the secure kernel 709. In one embodiment, the decryption of the encryption token may also be referred to as unwrapping for the encryption token.

In operation 773, the secure kernel 709 may decrypt the encryption token received from the blockchain trusted application 705 and may transmit the decrypted token to the blockchain trusted application 705.

In operation 774, the blockchain trusted application 705 may request the decryption of the encryption information from the secure kernel 709. In one embodiment, the decryption of the encryption information may be to obtain a private key from the root seed. In one embodiment, the decryption of the encryption information may also be referred to as unwrapping for the encryption information.

In operation 775, the secure kernel 709 may decrypt the encryption information received from the blockchain trusted application 705 and may transmit the decrypted encryption information to the blockchain trusted application 705. In one embodiment, the secure kernel 509 may obtain a user's private key (or secret key) based on the received encryption information.

In operation 776, the blockchain trusted application 705 may sign the transaction.

In operation 777, the blockchain trusted application 705 may transmit the result obtained by signing the transaction to the blockchain transaction signature application 701.

In one embodiment, the blockchain transaction signature application 701 may notify the application having generated the signature request for the transaction that the signature has been completed. In one embodiment, the blockchain transaction signature application 701 may send the signature result for the transaction to electronic devices (e.g., the electronic devices 102 and 104, and the server 108 of FIG. 1) participating in the distributed network.

Figure 8A:
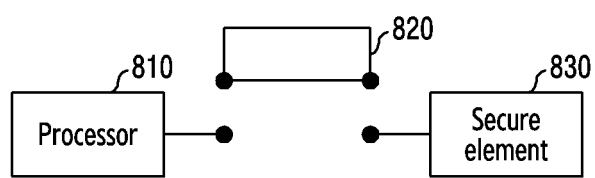
FIG. 8A is a diagram illustrating a secure switch of an electronic device according to an embodiment.
Figure 8B:
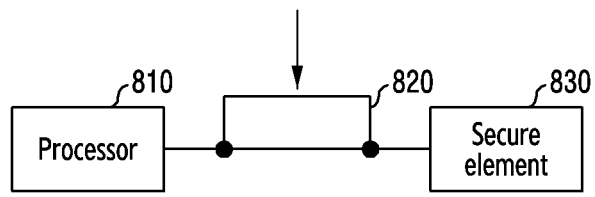
FIG. 8B is a diagram illustrating a secure switch of an electronic device according to an embodiment.

FIGS. 8A and 8B are diagrams illustrating a secure switch 820 of an electronic device (e.g., the electronic device 201 of FIG. 2 or the electronic device 302 of FIG. 3) according to an embodiment. In one embodiment, referring to FIGS. 8A and 8B, the secure switch 820 may be a button-type switch. In one embodiment, the secure switch 820 may be implemented with a home button, a volume button, or a combination thereof of the electronic device 201. In one embodiment, at least a portion of the secure switch 820 may be exposed to the outside through a housing (not shown) of the electronic device 201. According to an embodiment of the disclosure, the secure switch 820 is not limited to a physical switch, and may be configured in various other implementations. For example, in one embodiment, the secure switch 820 may be implemented as a logical switch as well as a physical switch. In one embodiment, the secure switch 820 may be further implemented with a switch icon displayed through a display (e.g., the display device 160 of FIG. 1) of the electronic device 201. In one embodiment, when the user applies an input (e.g., a touch input or a drag input) to the switch icon displayed through the display (e.g., the display device 160 of FIG. 1), the electronic device 201 may recognize the input to the switch icon as an input for connecting or disconnecting the processor 810 and the secure element 830. In one embodiment, the connection or disconnection between the processor 810 and the secure element 830 via the logical switch may be performed by formation or release of a logical path between the processor 810 and the secure element 830. In one embodiment, the logical path may refer to a path that can be provided or released by a program (e.g., the program 140 of FIG. 1). In one embodiment, when access rights to the logical path and secure gates for entering the logical path are coded and the user input corresponding to the switch icon is obtained, the secure gate code may be activated so that the processor 810 and the secure element 830 may be interworked to cause the logical path to operate.

Referring to FIGS. 8A and 8B, the processor 810 and the secure element 830 may be electrically connected or disconnected depending on the state of the secure switch 820. In one embodiment, referring to FIGS. 8A and 8B, the secure switch 820 may alternate between a first state (state in FIG. 8A, open state) and a second state (state in FIG. 8B, closed state) by the user input. In one embodiment, the secure switch 820 may be a normally open switch having the first state being the normal state.

Referring to FIG. 8A, the secure switch 820 may be in the first state (open state) when there is no user input. In one embodiment, referring to FIG. 8A, the secure switch 820 may electrically disconnect the processor 810 from the security element 830.

In one embodiment, referring to FIG. 8A, the processor 810 may not acquire encryption information stored in the secure element 830.

Referring to FIG. 8B, the secure switch 820 may be in the second state (closed state) when the user input is entered. In one embodiment, referring to FIG. 8B, the secure switch 820 may electrically connect the processor 810 and the security element 830.

Referring to FIG. 8B, in one embodiment, the processor 810 may acquire the encryption information stored in the secure element 830.

Figure 9A:
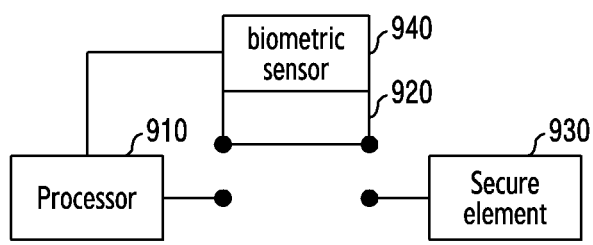
FIG. 9A is a diagram illustrating a secure switch of an electronic device according to an embodiment.
Figure 9B:
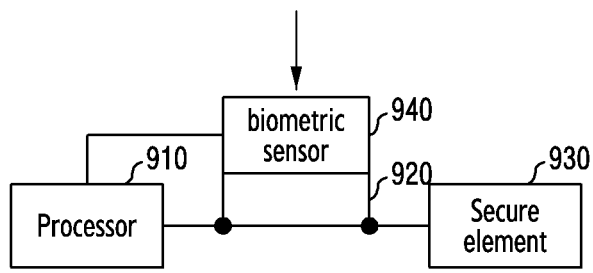
FIG. 9B is a diagram illustrating a secure switch of an electronic device according to an embodiment.

FIGS. 9A and 9B are diagrams illustrating a secure switch 920 of an electronic device (e.g., the electronic device 201 of FIG. 2 or the electronic device 302 of FIG. 3) according to an embodiment. In one embodiment, referring to FIGS. 9A and 9B, the secure switch 920 may be a button-type switch. In one embodiment, referring to FIGS. 9A and 9B, a biometric sensor 940 may be attached to a contact surface of the secure switch 920. In one embodiment, the secure switch 920 may be implemented with a home button and a volume button of the electronic device, or a combination thereof. In one embodiment, the biometric sensor 940 may be implemented as a fingerprint sensor. In one embodiment, at least a portion of the secure switch 920 and/or at least a portion of the biometric sensor 940 may be exposed to the outside through a housing (not shown) of the electronic device 201.

Referring to FIGS. 9A and 9B, the processor 910 and the secure element 930 may be electrically connected or disconnected depending on the state of the secure switch 920. In one embodiment, referring to FIGS. 9A and 9B, the secure switch 920 may alternate between a first state (state in FIG. 9A, open state) and a second state (state in FIG. 9B, closed state) by a user input. In one embodiment, the secure switch 920 may be a normally open switch having the first state being the normal state.

Referring to FIG. 9A, the secure switch 920 may be in the first state (open state) when there is no user input. In one embodiment, referring to FIG. 9A, the secure switch 920 may electrically disconnect the processor 910 from the security element 930.

In one embodiment, referring to FIG. 9A, the processor 810 may not acquire encryption information stored in the secure element 930. In one embodiment, referring to FIG. 9A, as there is no user input to the secure switch 920, the processor 910 cannot acquire biometric information about the user through the biometric sensor 940 located on the contact surface of the secure switch 920.

Referring to FIG. 9B, the secure switch 920 may be in the second state (closed state) when the user input exists. In one embodiment, referring to FIG. 9B, the secure switch 920 may electrically connect the processor 910 and the security element 930.

In one embodiment, referring to FIG. 9B, the processor 910 may acquire encryption information stored in the secure element 930. In one embodiment, referring to FIG. 9B, as the user input to the secure switch 920 is entered, the processor 910 can acquire the biometric information about the user through the biometric sensor 940 located on the contact surface of the secure switch 920. In one embodiment, the biometric sensor 940 may acquire the biometric information of the user while the sensor and the user's body are in contact with the user input. In one embodiment, the processor 910 may authenticate the user based on the obtained biometric information by using an authentication secure application (e.g., the authentication trusted application 313 of FIG. 3).

Figure 10A:
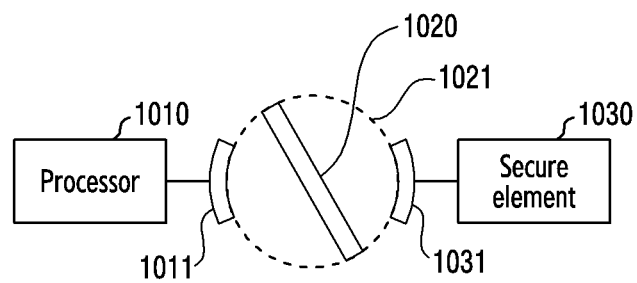
FIG. 10A is a diagram illustrating a secure switch of an electronic device according to an embodiment.
Figure 10B:
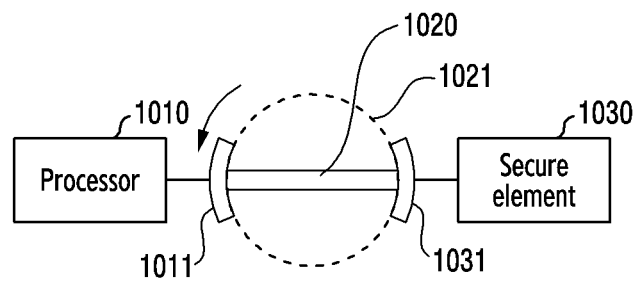
FIG. 10B is a diagram illustrating a secure switch of an electronic device according to an embodiment.

FIGS. 10A and 10B are diagrams illustrating a secure switch 1020 of an electronic device (e.g., the electronic device 201 of FIG. 2 or the electronic device 302 of FIG. 3) according to an embodiment. In one embodiment, referring to FIGS. 10A and 10B, the secure switch 1020 may be a rotary switch. In one embodiment, the secure switch 1020 may be implemented in a bezel of a wearable electronic device such as a smart watch.

Referring to FIGS. 10A and 10B, a processor 1010 and a secure element 1030 may be electrically connected or disconnected depending on the state of the secure switch 1020. In one embodiment, referring to FIGS. 10A and 10B, the secure switch 1020 may alternate between a first state (state in FIG. 10A, open state) and a second state (state in FIG. 10B, closed state) by a user input.

Referring to FIG. 10A, the secure switch 1020 has a first rotational state (open state) in which the secure switch 1020 does not contact an electrode 1011 of the processor 1010 and an electrode 1031 of the secure element 1030 from a rotatable area 1021. In one embodiment, the first rotational state in which the secure switch 1020 does not contact the electrode 1011 of the processor 1010 and the electrode 1031 of the secure element 1030 may be understood as the first state (open state). In one embodiment, referring to FIG. 10A, the secure switch 1020 may electrically disconnect the processor 1010 from the security element 1030 in the first state.

In one embodiment, referring to FIG. 10A, the processor 1010 cannot acquire the encryption information stored in the secure element 1030.

Referring to FIG. 10B, by a user input for rotating the secure switch 1020, the secure switch 1020 may be placed in the second state (closed state). Referring to FIG. 10B, by the user input for rotating the secure switch 1020, the secure switch 1020 may be placed in the second state (closed state) in which the secure switch 1020 contacts the electrode 1011 of the processor 1010 and the electrode 1031 of the secure element 1030. In one embodiment, referring to FIG. 10B, the secure switch 1020 may electrically connect the processor 1010 and the security element 1030.

Referring to FIG. 10B, the secure switch 1020 may have a second rotational state (closed state) in which the secure switch 1020 contacts the electrode 1011 of the processor 1010 and the electrode 1031 of the secure element 1030 from the rotatable area 1021. In one embodiment, the second rotational state in which the secure switch 1020 contacts the electrode 1011 of the processor 1010 and the electrode 1031 of the secure element 1030 may be understood as the second state (closed state). In one embodiment, referring to FIG. 10B, the secure switch 1020 may electrically disconnect the processor 1010 from the secure element 1030 in the second state by reverting to the first state.

In one embodiment, referring to FIG. 10B, the processor 1010 may acquire the encryption information stored in the secure element 1030.

Figure 11A:
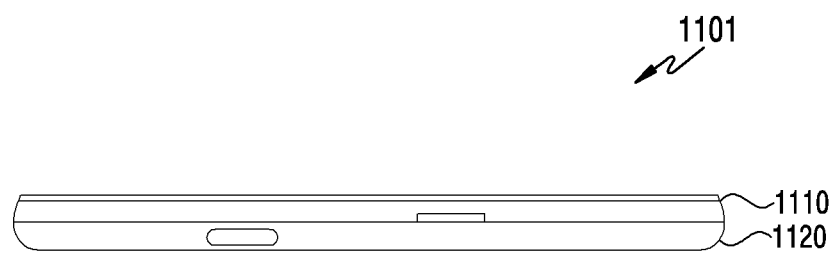
FIG. 11A is a diagram illustrating an electronic device according to an embodiment.
Figure 11B:
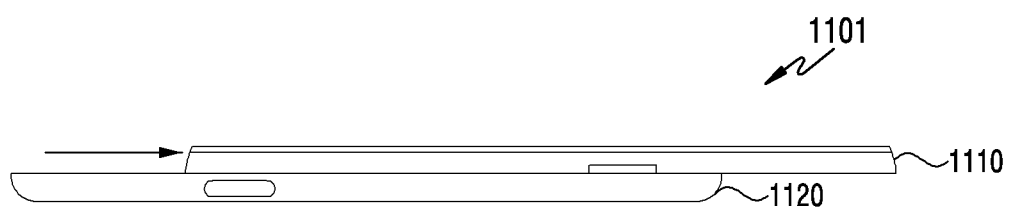
FIG. 11B is a diagram illustrating an electronic device according to an embodiment.

FIGS. 11A and 11B are diagrams illustrating an electronic device 1101 according to an embodiment. In one embodiment, FIGS. 11A and 11B are diagrams illustrating a case in which the electronic device 1101 according to an embodiment is viewed from the side. In one embodiment, referring to FIGS. 11A and 11B, the electronic device 1101 may alternate between an un-slid state (state in FIG. 11A) and a slid state (state in FIG. 11B) by a user input. In one embodiment, the un-slid state of the electronic device 1101 may be a state for providing a first user environment to a user. In one embodiment, the slid state of the electronic device 1101 may be a state for providing a second user environment distinct from the first user environment to the user.

In one embodiment, referring to FIG. 11A, the electronic device 1101 may be in the un-slid state.

In one embodiment, in the un-slid state of the electronic device 1101, a secure switch (e.g., the secure switch 220 of FIG. 2 or the secure switch 320 of FIG. 3) may have a first state (open state) in which the secure switch electrically disconnects a processor (e.g., the processor 210 of FIG. 2 or the processor 310 of FIG. 3) from a secure element (e.g., the secure element 230 of FIG. 2 or the secure element 330 of FIG. 3). In one embodiment, in the un-slid state of the electronic device 1101, the processor (e.g., the processor 210 of FIG. 2 or the processor 310 of FIG. 3) cannot acquire encryption information stored in the secure element (e.g., the secure element 230 of FIG. 2 or the secure element 330 of FIG. 3).

Referring to FIG. 11B, the electronic device 1101 may be in the slid state. In one embodiment, referring to FIG. 11B, when the electronic device 1101 is viewed from above, the electronic device 1101 may have a state in which at least a portion of a second portion 1120 is viewable by the user.

In one embodiment, in the slid state of the electronic device 1101, the secure switch (e.g., the secure switch 220 of FIG. 2 or the secure switch 320 of FIG. 3) may have a second state (closed state) in which the secure switch electrically connects the processor (e.g., the processor 210 of FIG. 2 or the processor 310 of FIG. 3) and the secure element (e.g., the secure element 230 of FIG. 2 or the secure element 330 of FIG. 3). In one embodiment, in the slid state of the electronic device 1101, the processor (the processor 210 in FIG. 2 or the processor 310 in FIG. 3) may acquire the encryption information stored in the secure element (e.g., the secure element 230 of FIG. 2 or the secure element 330 of FIG. 3).

Figure 12A:
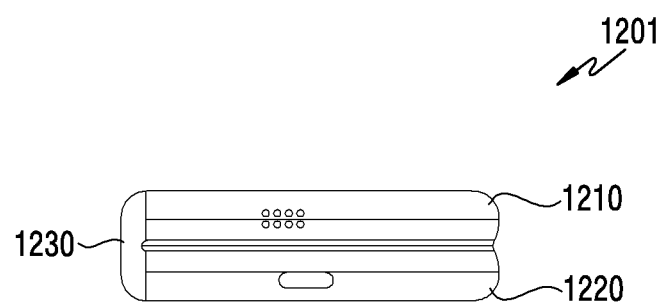
FIG. 12A is a diagram illustrating an electronic device according to an embodiment.
Figure 12B:
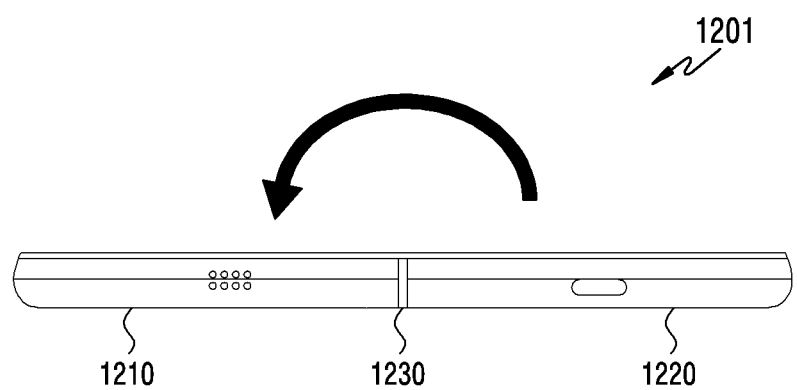
FIG. 12B is a diagram illustrating an electronic device according to an embodiment.

FIGS. 12A and 12B are diagrams illustrating an electronic device 1201 according to an embodiment. In one embodiment, FIGS. 12A and 12B are diagrams illustrating a case in which the electronic device 1201 according to an embodiment is viewed from the bottom. In one embodiment, referring to FIGS. 12A and 12B, the electronic device 1201 may alternate between a folded state (the state of FIG. 12A) and an unfolded state (the state of FIG. 12B) by a user input. In one embodiment, the folded state of the electronic device 1201 may be a state for providing a first user environment to a user. In one embodiment, the unfolded state of the electronic device 1201 may be a state for providing a second user environment distinct from the first user environment to the user.

In one embodiment, referring to FIG. 12A, the electronic device 1201 may be in the folded state. In one embodiment, referring to FIG. 12A, in the folded state, the electronic device 1201 may be in a state in which a third portion 1230 connecting the first portion 1210 and the second portion 1220 of the electronic device 1201 is bent. In one embodiment, referring to FIG. 12A, in the folded state, the electronic device 1201 may be in a state in which a first surface of the first portion 1210 of the electronic device 1201 and a first surface of the second portion 1220 face each other.

In one embodiment, in the folded state of the electronic device 1201, a secure switch (e.g., the secure switch 220 of FIG. 2 or the secure switch 320 of FIG. 3) may be in the first state (open state) in which the secure switch electrically disconnects a processor (e.g., the processor 210 of FIG. 2 or the processor 310 of FIG. 3) from a secure element (e.g., the secure element 230 of FIG. 2 or the secure element 330 of FIG. 3). In one embodiment, in the folded state of the electronic device 1201, the processor (e.g., the processor 210 of FIG. 2 or the processor 310 of FIG. 3) cannot acquire encryption information stored in the secure element (e.g., the secure element 230 of FIG. 2 or the secure element 330 of FIG. 3).

Referring to FIG. 12B, the electronic device 1101 may be in the unfolded state. In one embodiment, referring to FIG. 12B, in the unfolded state, the electronic device 1201 may be in a flat state of the third portion 1230 connecting the first portion 1210 and the second portion 1220 of the electronic device 1201. In one embodiment, referring to FIG. 12B, in the unfolded state, the electronic device 1201 may be in a state in which the first surface of the first portion 1210 and the first surface of the second portion 1220 of the electronic device 1201 face each other in the same direction.

In one embodiment, in the unfolded state of the electronic device 1201, a secure switch (e.g., the secure switch 220 of FIG. 2 or the secure switch 320 of FIG. 3) may be in the second state (closed state) in which the secure switch electrically connects a processor (e.g., the processor 210 of FIG. 2 or the processor 310 of FIG. 3) and a secure element (e.g., the secure element 230 of FIG. 2 or the secure element 330 of FIG. 3). In one embodiment, in the unfolded state of the electronic device 1201, the processor (e.g., the processor 210 of FIG. 2 or the processor 310 of FIG. 3) may acquire encryption information stored in the secure element (e.g., the secure element 230 of FIG. 2 or the secure element 330 of FIG. 3).

The electronic device 201 and the method as described above may minimize the time during which the processor 210 and the secure element 230 of the electronic device 201 are electrically connected with each other by electrically connecting or disconnecting the processor 210 and the secure element 230 through the secure switch 220, thereby minimizing the likelihood that personal information stored in the secure memory can be stolen by malicious applications.

According to an embodiment, the electronic device 201 may include a display; a memory configured to store encryption information; a processor; and a switch configured to electrically disconnect the processor from the memory in a first state and to electrically connect the processor and the memory in a second state, wherein the processor is configured to receive a user input for switching the switch from the first state to the second state while the switch is in the first state, to provide the encryption information stored in the memory to a secure application executing only in a second execution environment through a secure operating system of the second execution environment, when the switch is switched from the first state to the second state to generate an electrical path between the memory and the processor, to acquire signature information for a transaction based on the encryption information, and to provide the signature information acquired based on the encryption information to a signature request application.

In one embodiment, the processor may be configured to authenticate a user of the electronic device using an authentication secure application executing in the second execution environment, and to acquire the signature information for the transaction based on the encryption information, by using the secure application when the user of the electronic device is authenticated.

In one embodiment, the switch may include a sensor for biometric authentication that is directly contactable by the user, and the processor may be configured to acquire biometric information of the user while the sensor is in contact with the user according to the user input, and to authenticate the user of the electronic device based on the acquired biometric information by using the authentication secure application.

In one embodiment, the processor may be configured to authenticate the user based on biometric authentication, a data input pattern, or a combination thereof through the authentication secure application.

In one embodiment, the processor may be configured to receive a signature request for the transaction by using the signature request application, to provide a token for signing the transaction obtained using the secure application to the signature request application in response to the reception of the signature request, to provide the token to the authentication secure application by using the signature request application in response to providing the token to the signature request application, to provide an encryption token for the token obtained using the authentication secure application to the signature request application when the user of the electronic device is authenticated, and to acquire the signature information for the transaction based on the encryption information by using the secure application when the encryption token corresponds to the token obtained using the secure application.

In one embodiment, the processor may be configured to provide unwrapped encryption information of the encryption information to the secure application by using the secure operating system when the encryption token corresponds to the token obtained using the secure application, and to acquire the signature information for the transaction based on the unwrapped encryption information by using the secure application.

In one embodiment, the processor may be configured to display a screen for guiding the user input in response to the reception of the signature request for the transaction.

In one embodiment, the processor may be configured to identify whether the switch is in the second state in response to providing the encryption information to the secure application, and to display another screen for guiding release of the user input by using the signature request application in response to identifying that the switch is in the second state.

In one embodiment, the switch may be composed of at least one of a physical button or a physical wheel.

In one embodiment, the processor may be configured to transmit the transaction including the acquired signature information to a blockchain network through the signature request application so that the transaction including the acquired signature information is recorded in a block of a blockchain.

An operating method of an electronic device according to an embodiment may include: receiving a user input for switching a switch of the electronic device to a second state distinct from a first state while the switch of the electronic device is in the first state, wherein a processor of the electronic device is electrically disconnected from a memory of the electronic device while the switch is in the first state; providing encryption information stored in the memory to a secure application executing only in a second execution environment of the processor through a secure operating system of the second execution environment, when the switch is switched from the first state to the second state to generate an electrical path between the memory and the processor; acquiring signature information for a transaction based on the encryption information; and providing the signature information acquired based on the encryption information to a signature request application.

In one embodiment, the operating method may further include: authenticating a user of the electronic device using an authentication secure application executing in the second execution environment; and acquiring the signature information for the transaction based on the encryption information, by using the secure application when the user of the electronic device is authenticated.

In one embodiment, the switch may include a sensor for biometric authentication that is directly contactable by the user, and the operating method further may include acquiring biometric information of the user while the sensor is in contact with the user according to the user input, and authenticating the user of the electronic device based on the acquired biometric information by using the authentication secure application.

In one embodiment, the operating method further may include authenticating the user based on biometric authentication, a data input pattern, or a combination thereof through the authentication secure application.

In one embodiment, the operating method may further include: receiving a signature request for the transaction by using the signature request application; providing a token for signing the transaction obtained using the secure application to the signature request application in response to the reception of the signature request; providing the token to the authentication secure application by using the signature request application in response to providing the token to the signature request application; providing an encryption token for the token obtained using the authentication secure application to the signature request application when the user of the electronic device is authenticated; and acquiring the signature information for the transaction based on the encryption information by using the secure application when the encryption token corresponds to the token obtained using the secure application.

In one embodiment, the operating method may further include: displaying a screen for guiding the user input in response to the reception of the signature request for the transaction.

In one embodiment, the operating method may further include: identifying whether the switch is in the second state in response to providing the encryption information to the secure application; and displaying another screen for guiding release of the user input by using the signature request application in response to identifying that the switch is in the second state.

In one embodiment, the switch may be composed of at least one of a physical button or a physical wheel.

In one embodiment, the operating method may further include: transmitting the transaction including the acquired signature information to a distributed blockchain system through the signature request application so that the transaction including the acquired signature information is recorded in a block of a blockchain.

An electronic device 201 according to an embodiment may include: a memory configured to store encryption information; a processor; and a physical switch configured to electrically disconnect the processor from the memory in a first state and to electrically connect the processor and the memory in a second state, wherein the processor is configured to identify that the physical switch is switched to the second state by an input to the physical switch from a user, to read the encryption information stored in the memory by using a first application executing in a first execution environment of the processor, through an electrical path between the memory and the processor existing while the physical switch is maintained in the second state, to acquire signature information for a transaction based on the encryption information by using a second application executing in a second execution environment providing higher security than the first execution environment of the processor, wherein the encryption information is provided from the first application to the second application, and to provide the acquired signature information based on the encryption information from the second application to the first application.

In one embodiment, the physical switch may maintain the second state even when the user input to the physical switch is released.

In one embodiment, the physical switch may be switched from the second state to the first state by another input to the physical switch of the user.

In one embodiment, the physical switch may be switched from the second state to the first state when the user input to the physical switch is released.

In one embodiment, the physical switch may be composed of at least one of a physical button or a physical wheel.

In one embodiment, the processor may be configured to authenticate the user of the electronic device using a third application executing in the second execution environment, and to acquire signature information for the transaction based on the encryption information by using the second application when the user of the electronic device is authenticated.

In one embodiment, the physical switch may include a sensor for biometric authentication that is directly contactable by the user, and the processor may be configured to acquire the biometric information of the user by using the sensor while the input to the physical switch of the user is maintained and to authenticate the user of the electronic device based on the acquired biometric information by using the authentication secure application.

In one embodiment, the processor may be configured to receive a signature request for the transaction by using the first application, to provide a token for signing the transaction acquired using the second application to the first application in response to the reception of the signature request, to provide the token to the third application by using the first application in response to providing the token to the first application, to provide an encryption token for the token acquired using the third application to the first application when the user of the electronic device is authenticated using the third application, and to acquire the signature information for the transaction based on the encryption information by using the second application when the encryption token corresponds to the token acquired using the second application.

In one embodiment, the processor may be configured to provide unwrapped encryption information of the encryption information to the second application when the encryption token corresponds to the acquired token, and to acquire the signature information for the transaction based on the unwrapped encryption information by using the second application.

In one embodiment, the processor may be configured to transmit the transaction including the generated signature information to a blockchain network through the first application so that the transaction including the generated signature information can be recorded in a block of a blockchain.

An operating method of the electronic device 201 according to an embodiment may include: identifying whether a physical switch of the electronic device of a user is switched from a first state to a second state by an input to the physical switch, wherein the physical switch electrically disconnects a processor of the electronic device from a memory of the electronic device in the first state and electrically connects the processor and the memory in the second state; reading encryption information stored in the memory by using a first application executing in a first execution environment of the processor through an electrical path between the memory and the processor existing while the physical switch is maintained in the second state; providing the encryption information from the first application to a second application executing in a second execution environment providing higher security than the first execution environment of the processor; acquiring signature information for a transaction based on the encryption information by using the second application; and providing the signature information acquired based on the encryption information from the second application to the first application.

In one embodiment, the physical switch may maintain the second state even when the input to the physical switch is released.

In one embodiment, the physical switch may be switched from the second state to the first state by another input to the physical switch of the user.

In one embodiment, the physical switch may be switched from the second state to the first state when the input to the physical switch is released.

In one embodiment, the physical switch may be composed of at least one of a physical button or a physical wheel.

In one embodiment, the operating method may further include: authenticating the user of the electronic device using a third application executing in the second execution environment; and acquiring the signature information for the transaction based on the encryption information by using the second application when the user of the electronic device is authenticated.

In one embodiment, the operating method may further include: acquiring biometric information of the user by using a sensor for biometric authentication that is directly contactable by the user, which is included in the physical switch while the input to the physical switch of the user is maintained; and authenticating the user of the electronic device based on the acquired biometric information by using the authentication secure application.

In one embodiment, the acquiring of the signature information may further include: receiving a signature request for the transaction by using the first application; providing a token for signing the transaction acquired using the second application to the first application in response to the reception of the signature request; providing the token to the third application by using the first application in response to providing the token to the first application; providing an encryption token for the token acquired using the third application to the first application when the user of the electronic device is authenticated using the third application; and acquiring the signature information for the transaction based on the encryption information by using the second application when the encryption token corresponds to the token acquired using the second application.

In one embodiment, the operating method may further include: providing unwrapped encryption information of the encryption information to the second application when the encryption token corresponds to the acquired token; and acquiring the signature information for the transaction based on the unwrapped encryption information by using the second application.

In one embodiment, the operating method may further include: transmitting the transaction including the acquired signature information to a blockchain network through the first application so that the transaction including the acquired signature information can be recorded in a block of a blockchain.

Methods according to an embodiment of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The one or more program may include instructions that cause the electronic device to perform the methods according to an embodiment of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Any combination of some or all of them may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described example embodiments of the present disclosure, a component included in the present disclosure is expressed in the singular or the plural according to a presented example embodiment. However, the singular form or plural form is selected for convenience of description suitable for the presented situation, and an embodiment of the present disclosure are not limited to a single element or multiple elements thereof. Further, either multiple elements expressed in the description may be configured into a single element or a single element in the description may be configured into multiple elements.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been illustrated and described with reference to an example embodiment thereof, it will be understood by those skilled in the art that various changes in form and details may be made therein without departing from the true spirit and full scope of the present disclosure.

What is claimed is:

1. An electronic device comprising:
a display;
a memory configured to store encryption information;
a processor; and
a switch configured to electrically disconnect the processor from the memory in a first state and to electrically connect the processor and the memory in a second state,
wherein the processor is configured to:
receive a user input for switching the switch from the first state to the second state while the switch is in the first state,
provide the encryption information stored in the memory to a secure application executing only in a second execution environment through a secure operating system of the second execution environment, when the switch is switched from the first state to the second state to generate an electrical path between the memory and the processor,
acquire signature information for a transaction based on the encryption information, and
provide the signature information acquired based on the encryption information to a signature request application,
wherein the processor is further configured to:
receive a signature request for the transaction by using the signature request application,
provide a token for signing the transaction obtained using the secure application to the signature request application in response to the reception of the signature request,
provide the token to an authentication secure application executing in the second execution environment by using the signature request application in response to providing the token to the signature request application,
authenticate a user of the electronic device using the authentication secure application,
provide an encryption token for the token obtained using the authentication secure application to the secure application through the signature request application when the user of the electronic device is authenticated,
provide a decrypted encryption token to the secure application in response to a decryption request, and
acquire the signature information for the transaction based on the encryption information by using the secure application when the decrypted encryption token corresponds to the token obtained using the secure application.

2. The electronic device of claim 1, wherein the switch comprises a sensor for biometric authentication that is directly contactable by the user, and the processor is configured to:

acquire biometric information of the user while the sensor is in contact with the user according to the user input, and authenticate the user of the electronic device based on the acquired biometric information by using the authentication secure application.

3. The electronic device of claim 1, wherein the processor is configured to authenticate the user based on biometric authentication, a data input pattern, or a combination thereof through the authentication secure application.

4. The electronic device of claim 1, wherein the processor is configured to:

provide unwrapped encryption information of the encryption information to the secure application by using the secure operating system when the decrypted encryption token corresponds to the token obtained using the secure application, and acquire the signature information for the transaction based on the unwrapped encryption information by using the secure application.

5. The electronic device of claim 1, wherein the processor is configured to display a screen for guiding the user input in response to the reception of the signature request for the transaction.

6. The electronic device of claim 1, wherein the processor is configured to:

identify whether the switch is in the second state in response to providing the encryption information to the secure application, and display another screen for guiding release of the user input by using the signature request application in response to identifying that the switch is in the second state.

7. The electronic device of claim 1, wherein the switch comprises a physical button and/or a physical wheel.

8. The electronic device of claim 1, wherein the processor is configured to transmit the transaction including the acquired signature information to a blockchain network through the signature request application so that the transaction including the acquired signature information is recorded in a block of a blockchain.

9. An operating method of an electronic device comprising:

receiving a user input for switching a switch of the electronic device to a second state distinct from a first state while the switch of the electronic device is in the first state, wherein a processor of the electronic device is electrically disconnected from a memory of the electronic device while the switch is in the first state;

providing encryption information stored in the memory to a secure application executing only in a second execution environment of the processor through a secure operating system of the second execution environment, when the switch is switched from the first state to the second state to generate an electrical path between the memory and the processor;

acquiring signature information for a transaction based on the encryption information; and providing the signature information acquired based on the encryption information to a signature request application, the operating method further comprising:

receiving a signature request for the transaction by using the signature request application;

providing a token for signing the transaction obtained using the secure application to the signature request application in response to the reception of the signature request;

providing the token to an authentication secure application executing in the second execution environment by using the signature request application in response to providing the token to the signature request application;

authenticating a user of the electronic device using the authentication secure application;

providing an encryption token for the token obtained using the authentication secure application to the secure application through the signature request application when the user of the electronic device is authenticated;

providing a decrypted encryption token to the secure application in response to a decryption request; and acquiring the signature information for the transaction based on the encryption information by using the secure application when the decrypted encryption token corresponds to the token obtained using the secure application.

10. The operating method of claim 9, wherein the switch comprises a sensor for biometric authentication that is directly contactable by the user, and the operating method further comprises:

acquiring biometric information of the user while the sensor is in contact with the user according to the user input; and authenticating the user of the electronic device based on the acquired biometric information by using the authentication secure application.

11. The operating method of claim 9, wherein the operating method further comprises authenticating the user based on biometric authentication, a data input pattern, or a combination thereof through the authentication secure application.

12. The operating method of claim 9, further comprising:

displaying a screen for guiding the user input in response to the reception of the signature request for the transaction.

13. The operating method of claim 9, further comprising:

identifying whether the switch is in the second state in response to providing the encryption information to the secure application; and displaying another screen for guiding release of the user input by using the signature request application in response to identifying that the switch is in the second state.

14. The operating method of claim 9, wherein the switch comprises a physical button and/or a physical wheel.

15. The operating method of claim 9, further comprising:

transmitting the transaction including the acquired signature information to a distributed blockchain system through the signature request application so that the transaction including the acquired signature information is recorded in a block of a blockchain.

16. An electronic device comprising:

a memory configured to store encryption information;

a processor; and a physical switch configured to electrically disconnect the processor from the memory in a first state and to electrically connect the processor and the memory in a second state, wherein the processor is configured to:

identify that the physical switch is switched to the second state by an input to the physical switch from a user, acquire the encryption information stored in the memory by using a first application executing in a first execution environment of the processor, through an electrical path between the memory and the processor existing while the physical switch is maintained in the second state, acquire signature information for a transaction based on the encryption information by using a second application executing in a second execution environment providing higher security than the first execution environment of the processor, and provide the acquired signature information based on the encryption information from the second application to the first application, wherein the processor is further configured to:

receive a signature request for the transaction by using the first application, provide a token for signing the transaction obtained using the second application to the first application in response to the reception of the signature request, provide the token to a third application executing in the second execution environment by using the first application in response to providing the token to the first application, authenticate a user of the electronic device using the third application, provide an encryption token for the token obtained using the third application to the second application through the first application when the user of the electronic device is authenticated, provide a decrypted encryption token to the second application in response to a decryption request, and acquire the signature information for the transaction based on the encryption information by using the second application when the decrypted encryption token corresponds to the token obtained using the second application.

\* \* \* \* \*